United States Patent
Cho

(10) Patent No.: US 11,307,623 B2
(45) Date of Patent: Apr. 19, 2022

(54) SYSTEM, CONTROLLER, AND METHOD FOR OPERATING SYSTEM TO DETERMINE AMOUNT OF CURRENT FOR MULTIPLE POWER DOMAIN MODULES

(71) Applicant: SK hynix Inc., Icheon-si (KR)

(72) Inventor: Sung Yeob Cho, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 63 days.

(21) Appl. No.: 16/878,335

(22) Filed: May 19, 2020

(65) Prior Publication Data
US 2021/0181824 A1 Jun. 17, 2021

(30) Foreign Application Priority Data
Dec. 11, 2019 (KR) .................. 10-2019-0164335

(51) Int. Cl.
*G06F 1/3203* (2019.01)
*G06F 1/26* (2006.01)
*G05B 19/042* (2006.01)

(52) U.S. Cl.
CPC ............ *G06F 1/26* (2013.01); *G05B 19/042* (2013.01); *G05B 2219/25364* (2013.01)

(58) Field of Classification Search
CPC ..................................................... G06F 1/3203
USPC ........................................................ 713/300
See application file for complete search history.

(56) References Cited

U.S. PATENT DOCUMENTS

| 7,064,599 B1 * | 6/2006 | Taft ...................... H03K 17/063 |
| | | 326/113 |
| 2015/0022173 A1 * | 1/2015 | Le ........................... H02M 3/00 |
| | | 323/282 |
| 2016/0179164 A1 * | 6/2016 | Park ........................ G06F 1/329 |
| | | 713/322 |
| 2016/0363985 A1 * | 12/2016 | Ehmann .................. G06F 13/37 |

FOREIGN PATENT DOCUMENTS

| CN | 101986241 A | * 3/2011 | ............. G06F 1/266 |
| KR | 1020190041319 A | 4/2019 | |
| KR | 1020200015190 A | 2/2020 | |

* cited by examiner

*Primary Examiner* — Suresh Suryawanshi
(74) *Attorney, Agent, or Firm* — William Park & Associates Ltd.

(57) ABSTRACT

Embodiments of the present disclosure relate to a system, a controller, and a method for operating the same. The amount of current that each of multiple power domain modules can use may be determined, and information regarding the amount of usable current may be indicated to each power domain module, thereby controlling the total sum of peak power used by the multiple power domain modules at a specific timepoint to be equal to or lower than a configured value.

14 Claims, 19 Drawing Sheets

SYSTEM, CONTROLLER, AND METHOD FOR OPERATING SYSTEM TO DETERMINE AMOUNT OF CURRENT FOR MULTIPLE POWER DOMAIN MODULES

CROSS REFERENCE TO RELATED APPLICATION

This application claims priority under 35 U.S.C. § 119(a) from Korean Patent Application No. 10-2019-0164335, filed on Dec. 11, 2019, in the Korean Intellectual Property Office, the entire disclosure of which is incorporated herein by reference.

BACKGROUND

1. Technical Field

Embodiments of the present disclosure relate to a system, a controller, and a method for operating the system.

2. Related Art

Various systems have been developed to implement functions of electronic devices such as computers, smartphones, and tablets. Such systems include, for example, a memory system, such as a hard disk drive (HDD) and a solid state drive (SSD), configured to store data. Another system is a communication system configured to communicate with an external device on the basis of various wired/wireless protocols (for example, Bluetooth, Ethernet, and Wi-Fi).

The amount of power consumed by such a system may change depending on the operation performed by the system. If the amount of power consumed by the system at a specific time is much larger than the amount of power supplied to the system, then the system is likely to operate abnormally.

SUMMARY

Embodiments of the present disclosure may provide a system, a controller, and a method for operating the system, wherein the total sum of peak power used by multiple power domain modules at a specific time can be controlled to be equal to or lower than a configured value.

In an aspect, embodiments of the present disclosure may provide a system including: multiple power domain modules; and a controller configured to control the power domain modules.

The multiple power domain modules may respectively receive power supplied from different power sources.

The controller may determine the amount of current that each power domain module can use. In addition, the controller may indicate information regarding the amount of usable current to each power domain module, thereby controlling the total sum of peak power used by the multiple power domain modules.

For example, the controller may output at least one class signal to each power domain module. Each of the at least one class signal may indicate whether or not each power domain module can use as much current as the amount of current configured in each class signal.

Each power domain module may include at least one operating block. A first operating block among the at least one operating block may receive at least one class signal indicating the amount of current that the first operating block can use. In addition, the first operating block may output at least one class signal indicating the remaining amount of current obtained by subtracting the amount of current used by the first operating block from the amount of current that the first operating block can use.

Each power domain module may output a feedback signal indicating the remaining amount of current, excluding the amount of current used by each power domain module, to the controller.

As another example, the controller may receive a request signal from each power domain module. The request signal is a signal indicating information regarding the amount of current requested by each power domain module.

In addition, the controller may output a grant signal to each power domain module. The grant signal is a signal indicating information regarding the amount of current that each power domain module can use.

In another aspect, embodiments of the present disclosure may provide a controller configured to control multiple power domain modules.

The controller may determine the amount of current that each of multiple power domain modules respectively receiving power from different power sources can use.

In addition, the controller may indicate information regarding the amount of usable current to each power domain module, thereby controlling the total sum of peak power used by the multiple power domain modules.

For example, the controller may output at least one class signal to each power domain module. Each of the at least one class signal is a signal indicating whether or not each power domain module can use as much current as the amount of current configured in each class signal.

As another example, the controller may receive a request signal from each power domain module. The request signal is a signal indicating information regarding the amount of current requested by each power domain module.

In addition, the controller may output a grant signal to each power domain module. The grant signal is a signal indicating information regarding the amount of current that each power domain module can use.

In another aspect, embodiments of the present disclosure may provide a method for operating a system.

The method for operating a system may include a step of determining the amount of current that each of multiple power domains modules can use.

In addition, the method for operating a system may include a step of indicating information regarding the amount of usable current to each power domain module.

According to embodiments of the present disclosure, the total sum of peak power used by multiple power domain modules at a specific time can be controlled to be equal to or lower than a configured value.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Hereinafter, embodiments of the present disclosure will be described in detail with reference to the accompanying drawings.

Figure 1:
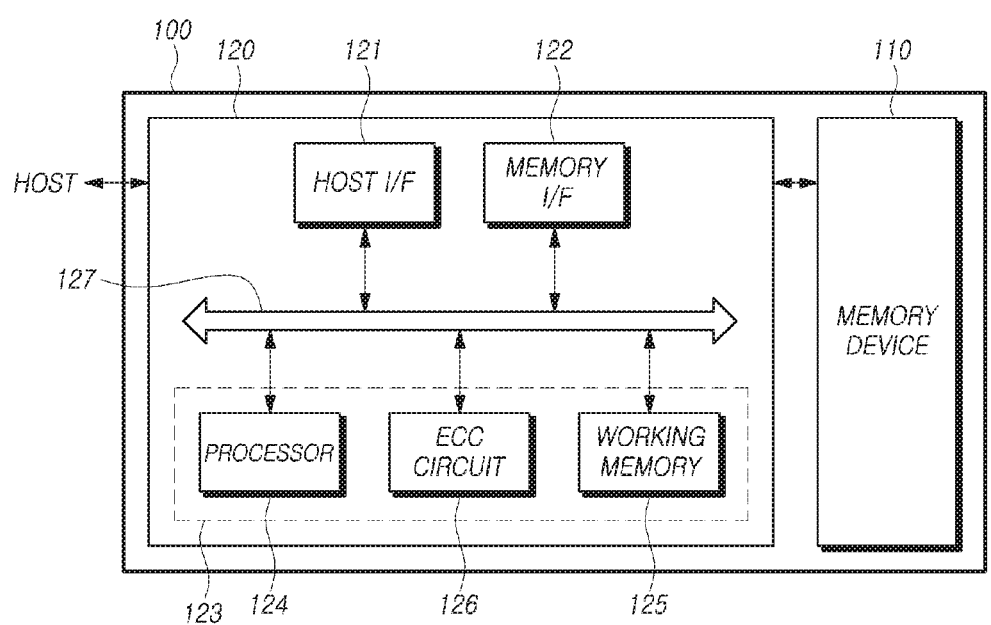
FIG. 1 is a diagram illustrating a schematic configuration of a memory system according to embodiments of the present disclosure.

FIG. 1 is a diagram illustrating a schematic configuration of a memory system 100 according to embodiments of the present disclosure.

Referring to FIG. 1, the memory system 100 may include the memory device 110 configured to store data, a memory controller 120 configured to control the memory device 110, and the like.

The memory device 110 includes multiple memory blocks and operates in response to control of the memory controller 120. Operations of the memory device 110 may include, for example, a read operation, a program operation (also referred to as "write operation"), an erasure operation, and the like.

The memory device 110 may include a memory cell array including multiple memory cells (also simply referred to as "cell") configured to store data. The memory cell array may exist in a memory block.

The memory device 110 may be implemented in various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having a charge storage layer configured by a conductive floating gate, but also to a charge trap flash (CTF) having a charge storage layer configured by an insulating film.

The memory device 110 is configured to receive a command, an address, and the like from the memory controller 120 and to access an area selected by the address inside the memory cell array. That is, the memory device 110 may perform an operation corresponding to the command with regard to the area selected by the address.

For example, the memory device 110 may perform a program operation, a read operation, an erasure operation, and the like. In relation thereto, during a program operation, the memory device 110 may program data in an area selected by an address. During a read operation, the memory device 110 may read data from an area selected by an address. During an erasure operation, the memory device 110 may erase data stored in an area selected by an address.

The memory controller 120 may control a write (program) operation, a read operation, an erasure operation, and a background operation regarding the memory device 110. The background operation may include, for example, at least one selected from a garbage collection (GC) operation, a wear leveling (WL) operation, and a bad block management (BBM) operation.

The memory controller 120 may control operations of the memory device 110 at the request of a host HOST. Alternatively, the memory controller 120 may control operations of the memory device 110 regardless of the request of the host HOST.

The memory controller 120 and the host HOST may be separate devices. If necessary, the memory controller 120 and the host HOST may be integrated into and implemented as a single device. It will be assumed in the following description, for convenience of description, that the memory controller 120 and the host HOST are separate devices.

Referring to FIG. 1, the memory controller 120 may include a memory interface 122, a control circuit 123, and the like, and may further include a host interface 121 and the like.

The host interface 121 is configured to provide an interface for communicating with the host HOST.

When receiving a command from the host HOST, the control circuit 123 may perform operations of receiving the command through the host interface 121 and processing the received command.

The memory interface 122 is connected to the memory device 110 and is configured to provide an interface for communicating with the memory device 110. That is, the memory interface 122 may be configured to provide an interface between the memory device 110 and the memory controller 120 in response to control of the control circuit 123.

The control circuit 123 is configured to control overall operations of the memory controller 120, thereby controlling operations of the memory device 110. To this end, the control circuit 123 may include, for example, at least one selected from a processor 124 and a working memory 124, and may further include an error detection-and-correction circuit (ECC circuit) 126, if necessary.

The processor 124 may control overall operations of the memory controller 120 and may perform logical operations. The processor 124 may communicate with the host HOST through the host interface 121 and may communicate with the memory device 110 through the memory interface 122.

The processor 124 may perform the function of a flash translation layer (FTL). The processor 124 may convert a logical block address (LBA) provided by the host to a physical block address (PBA) through the FTL. The FTL may receive the LBA and convert the same to the PBA by using a mapping table.

The FTL may map addresses in various methods, depending on the mapping unit. Typical address mapping methods include a page mapping method, a block mapping method, and a hybrid mapping method.

The processor 124 is configured to randomize data received from the host HOST. For example, the processor 124 may randomize data received from the host HOST by using a randomizing seed. The randomized data is provided to the memory device 110 as data to be stored, and is programmed in the memory cell array.

The processor 124 is configured to derandomize data received from the memory device 110 during a read operation. For example, the processor 124 may derandomize data received from the memory device 110 by using a derandomizing seed. The derandomized data may be output to the host HOST.

The processor 124 may execute firmware so as to control operations of the memory controller 120. In other words, the processor 124 may control overall operations of the memory controller 120 and may execute (drive) firmware loaded into the working memory 125 during booting, in order to perform a logical operation.

The firmware may be a program executed inside the memory system 100, and may include various functional layers.

For example, the firmware may include at least one selected from a flash translation layer (FTL) configured to translate between a logical address that the host HOS requests the memory system 100 to provide and a physical address of the memory device 110, a host interface layer (HIL) configured to interpret a command that the host HOST requests the memory system 100 (storage device) to follow and to deliver the same to the FTL, and a flash interface layer (FIL) configured to deliver a command issued by the FTL to the memory device 110.

The firmware may be stored in the memory device 110, for example, and then loaded into the working memory 125.

The working memory 125 may store firmware, program codes, commands, or data necessary to drive the memory controller 120. The working memory 125 may include, as a volatile memory, at least one selected from a static RAM (SRAM), a dynamic RAM (DRAM), and a synchronous DRAM (SDRAM), for example.

The error detection-and-correction circuit 126 may be configured to detect an error bit of checking target data by using an error correction code and to correct the detected error bit. The checking target data may be, for example, data stored in the working memory 125 or data retrieved from the memory device 110.

The error detection-and-correction circuit 126 may be implemented to decode data by using the error correction code. The error detection-and-correction circuit 126 may be implemented by various code decoders. For example, a decoder configured to perform unsystematic code decoding or a decoder configured to perform systematic code decoding may be used.

For example, the error detection-and-correction circuit 126 may detect error bits, sector by sector, with regard to respective pieces of read data. That is, each piece of read data may include multiple sectors. A sector may refer to a data unit smaller than a page, which is the read unit of a flash memory. Sectors constituting each piece of read data may correspond to each other via addresses.

The error detection-and-correction circuit 126 may calculate a bit error rate (BER) and determine whether or not each sector is correctable. For example, if the BER is higher than a reference value, the error detection-and-correction circuit 126 may determine that the corresponding sector is uncorrectable (or has failed). On the other hand, if the BER is lower than the reference value, the error detection-and-correction circuit 126 may determine that the corresponding sector is correctable (or has passed).

The error detection-and-correction circuit 126 may successively perform error detection and correction operations with regard to all pieces of read data. If a sector included in read data is correctable, the error detection-and-correction circuit 126 may omit the error detection and correction operations regarding the corresponding sector with regard to the next piece of read data. After the error detection correction operations are finished with regard to all pieces of read data in this manner, the error detection-and-correction circuit 126 may detect a sector deemed uncorrectable to the end. There may be one or more sectors deemed uncorrectable. The error detection-and-correction circuit 126 may deliver information (for example, address information) regarding the sector deemed uncorrectable to the processor 124.

The bus 127 may be configured to provide a channel between the components 121, 122, 124, 125, and 126 of the memory controller 120. The bus 127 may include, for example, a control bus for delivering various kinds of control signals and commands and a data bus for delivering various kinds of data.

The memory controller 120 and the above-mentioned components 121, 122, 124, 125, and 126 are only examples. Some of the above-mentioned components 121, 122, 124, 125, and 126 of the memory controller 120 may be omitted, or some of the above-mentioned components 121, 122, 124, 125, and 126 of the memory controller 120 may be integrated into one. If necessary, one or more components may be added other than the above-mentioned components of the memory controller 120.

Hereinafter, the memory device 110 will be described in more detail with reference to FIG. 2.

Figure 2:
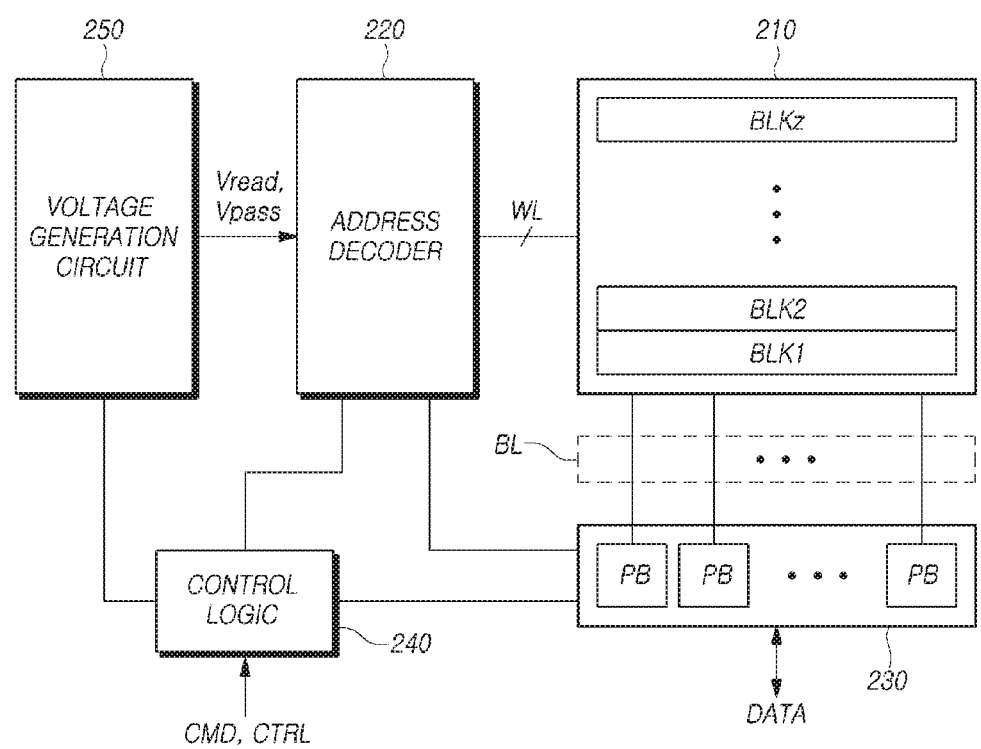
FIG. 2 is a block diagram schematically illustrating a memory device according to embodiments of the present disclosure.

FIG. 2 is a block diagram schematically illustrating the memory device 110 according to embodiments of the present disclosure.

Referring to FIG. 2, the memory device 110 may include a memory cell array 210, an address decoder 220, a read-and-write circuit 230, control logic circuit 240, a voltage generation circuit 250, and the like.

The memory cell array 210 may include multiple memory blocks BLK1-BLKz (z is a natural number equal to or larger than 2).

In the multiple memory blocks BLK1-BLKz, multiple word lines WL and multiple bit lines BL may be disposed, and multiple memory cells MC may be arranged therein.

The multiple memory blocks BLK1-BLKz may be connected to the address decoder 220 through the multiple word lines WL. The multiple memory blocks BLK1-BLKz may be connected to the read-and-write circuit 230 through the multiple bit lines BL.

Each of the multiple memory blocks BLK1-BLKz may include multiple memory cells. For example, the multiple memory cells may be nonvolatile memory cells, and may include nonvolatile memory cells having a vertical channel structure.

The memory cell array 210 may be configured as a memory cell array having a two-dimensional structure, and may be configured as a memory cell array having a three-dimensional structure, if necessary.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data. As another example, each of the multiple memory cells included in the memory cell array 210 may be a triple-level cell (TLC) configured to store three bits of data. As another example, each of the multiple memory cells included in the memory cell array 210 may be a quad-level cell (QLC) configured to store four bits of data. As another example, the memory cell array 210 may include multiple memory cells each configured to store at least five bits of data.

Referring to FIG. 2, the address decoder 220, the read-and-write circuit 230, the control logic circuit 240, the voltage generation circuit 250, and the like may operate as peripheral circuits configured to drive the memory cell array 210.

The address decoder 220 may be connected to the memory cell array 210 through multiple word lines WL.

The address decoder 220 may be configured to operate in response to control of the control logic circuit 240.

The address decoder 220 may receive addresses through an input/output buffer inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

In the case of a read voltage applying operation during a read operation, the address decoder 220 may apply a read voltage Vread to a selected word line WL inside a selected memory block, and may apply a pass voltage Vpass to the remaining unselected word lines WL.

During a program verification operation, the address decoder 220 may apply a verification voltage generated by the voltage generation circuit 250 to the selected word line WL inside the selected memory block, and may apply a pass voltage Vpass to the remaining unselected word lines WL.

The address decoder 220 may be configured to decode a column address among received addresses. The address decoder 220 may transmit the decoded column address to the read-and-write circuit 230.

The read operation and program operation of the memory device 110 may be performed page by page. Addresses received when the read operation and program operation are requested may include at least one selected from a block address, a row address, and a column address.

The address decoder 220 may select one memory block and one word line according to the block address and the row address. The column address may be decoded by the address decoder 220 and provided to the read-and-write circuit 230.

The address decoder 220 may include at least one selected from a block decoder, a row decoder, a column decoder, and an address buffer.

The read-and-write circuit 230 may include multiple page buffers PB. The read-and-write circuit 230 may operate as a "read circuit" during a read operation of the memory cell array 210 and may operate as a "write circuit" during a write operation thereof.

The above-mentioned read-and-write circuit 230 is also referred to as a page buffer circuit including multiple page buffers PB, or a data register circuit. The read-and-write circuit 230 may include a data buffer in charge of a data processing function, and may further include a cache buffer in charge of a caching function, if necessary.

The multiple page buffers PB may be connected to the memory cell array 210 through multiple bit lines BL. During a read operation and a program verification operation, the multiple page buffers PB may continuously supply a sensing current to bit lines BL connected to memory cells, in order to sense the threshold voltage Vth of the memory cells, may sense a change in the amount of flowing current according to the program state of a corresponding memory cell through a sensing node, and may latch the same as sensing data.

The read-and-write circuit 230 may operate in response to page buffer control signals output from the control logic circuit 240.

During a read operation, the read-and-write circuit 230 senses data in a memory cell, temporarily stores the retrieved data, and outputs the data DATA to the input/output buffer of the memory device 110. As an embodiment, the read-and-write circuit 230 may include a column selection circuit and the like in addition to the page buffers PB or page resisters.

The control logic circuit 240 may be connected to the address decoder 220, the read-and-write circuit 230, the voltage generation circuit 250, and the like. The control logic circuit 240 may receive a command CMD and a control signal CTRL through the input/output buffer of the memory device 110. The control logic circuit 240 may be implemented as hardware, software, or a combination of hardware and software. For example, the control logic circuit 240 may be a control logic circuit operating in accordance with an algorithm and/or a processor executing control logic code.

The control logic circuit 240 may be configured to control overall operations of the memory device 110 in response to the control signal CTRL. The control logic circuit 240 may output a control signal for adjusting the pre-charge potential level of sensing nodes of multiple page buffers PB.

The control logic circuit 240 may control the read-and-write circuit 230 so as to perform a read operation of the memory cell array 210. In response to a voltage generation circuit control signal output from the control logic circuit 240, the voltage generation circuit 250 may generate a read voltage Vread and a pass voltage Vpass, which are used during a read operation.

Figure 3:
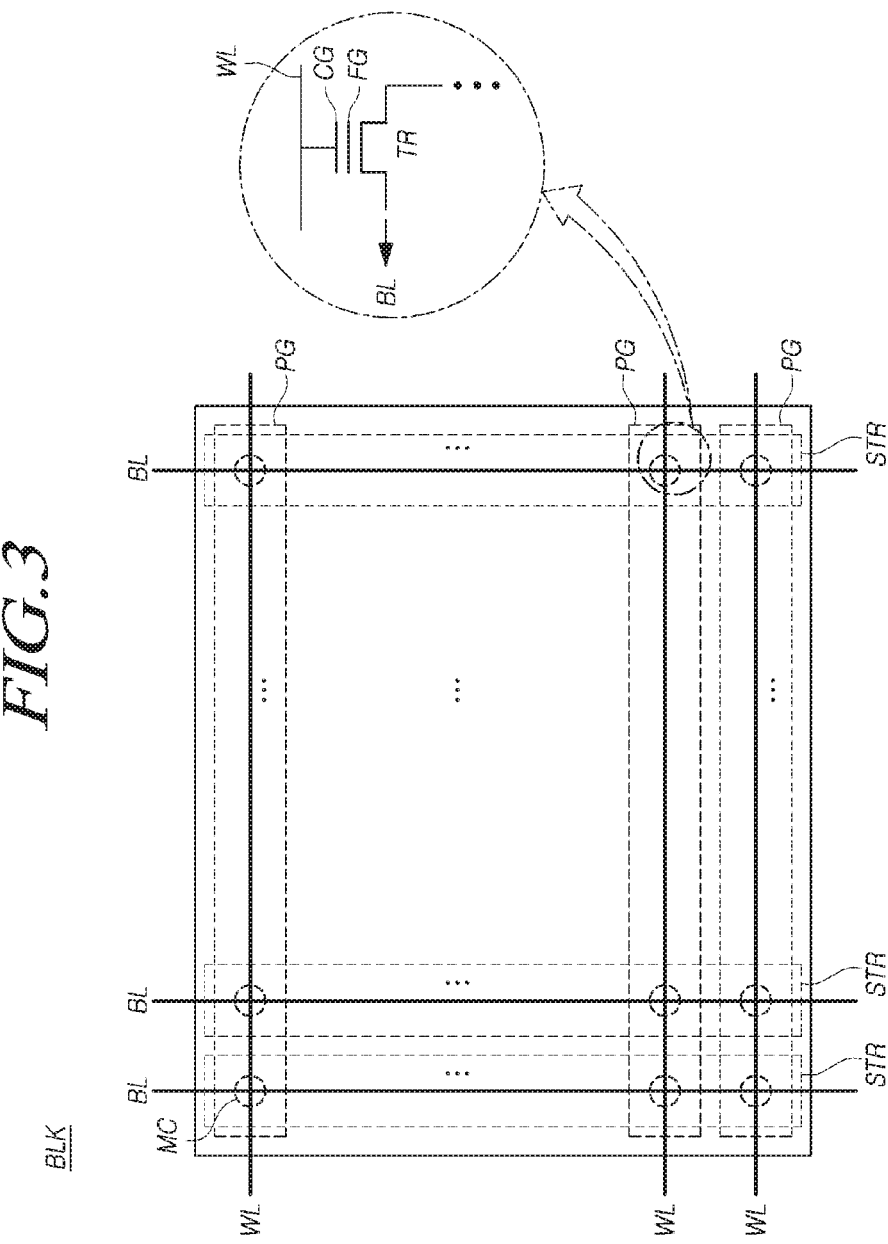
FIG. 3 is a diagram schematically illustrating respective memory blocks of a memory device according to embodiments of the present disclosure.

FIG. 3 is a diagram schematically illustrating respective memory blocks BLK of the memory device 110 according to embodiments of the present disclosure.

Referring to FIG. 3, a memory block BLK included in the memory device 110 may include, for example, multiple pages PG and multiple strings STR disposed in intersecting directions.

The multiple pages PG correspond to multiple word lines WL, and the multiple string STR correspond to multiple bit lines BL.

The memory block BLK may have multiple word lines WL and multiple bit lines BL disposed so as to intersect with each other. For example, each of the multiple word lines WL may be disposed in a row direction, and each of the multiple bit lines BL may be disposed in a column direction. As another example, each of the multiple word lines WL may be disposed in the column direction, and each of the multiple bit lines BL may be disposed in the row direction.

Multiple word lines WL and multiple bit lines BL may insect with each other, thereby defining multiple memory cells MC. Each memory cell MC may have a transistor TR disposed therein.

For example, the transistor TR disposed in each memory cell MC may include a drain, a source, a gate, and the like. The drain (or source) of the transistor TR may be directly connected to a corresponding bit line BL or connected thereto via another transistor TR. The source (or drain) of the transistor TR may be directly connected to a source line (which may be ground) or connected thereto via another transistor TR. The gate of the transistor TR may include a floating gate (FG) surrounded by an insulator and a control gate (CG) to which a gate voltage is applied from a word line WL.

Each of the multiple memory blocks BLK1-BLKz may have a first selection line (also referred to as a source selection line or a drain selection line) additionally disposed outside a first outermost word line, which is closer to the read-and-write circuit 230 among two outermost word lines BL, and may have a second selection line (also referred to as a drain selection line or a source selection line) additionally disposed outside a second outermost word line, which is the other among the same.

If necessary, at least one dummy word line may be additionally disposed between the first outermost word line and the first selection line. In addition, at least one dummy word line may be additionally disposed between the second outermost word line and the second selection line.

When having a memory block structure as illustrated in FIG. 3, a read operation and a program operation (write operation) may be performed page by page, and an erasure operation may be performed for each memory block.

Figure 4:
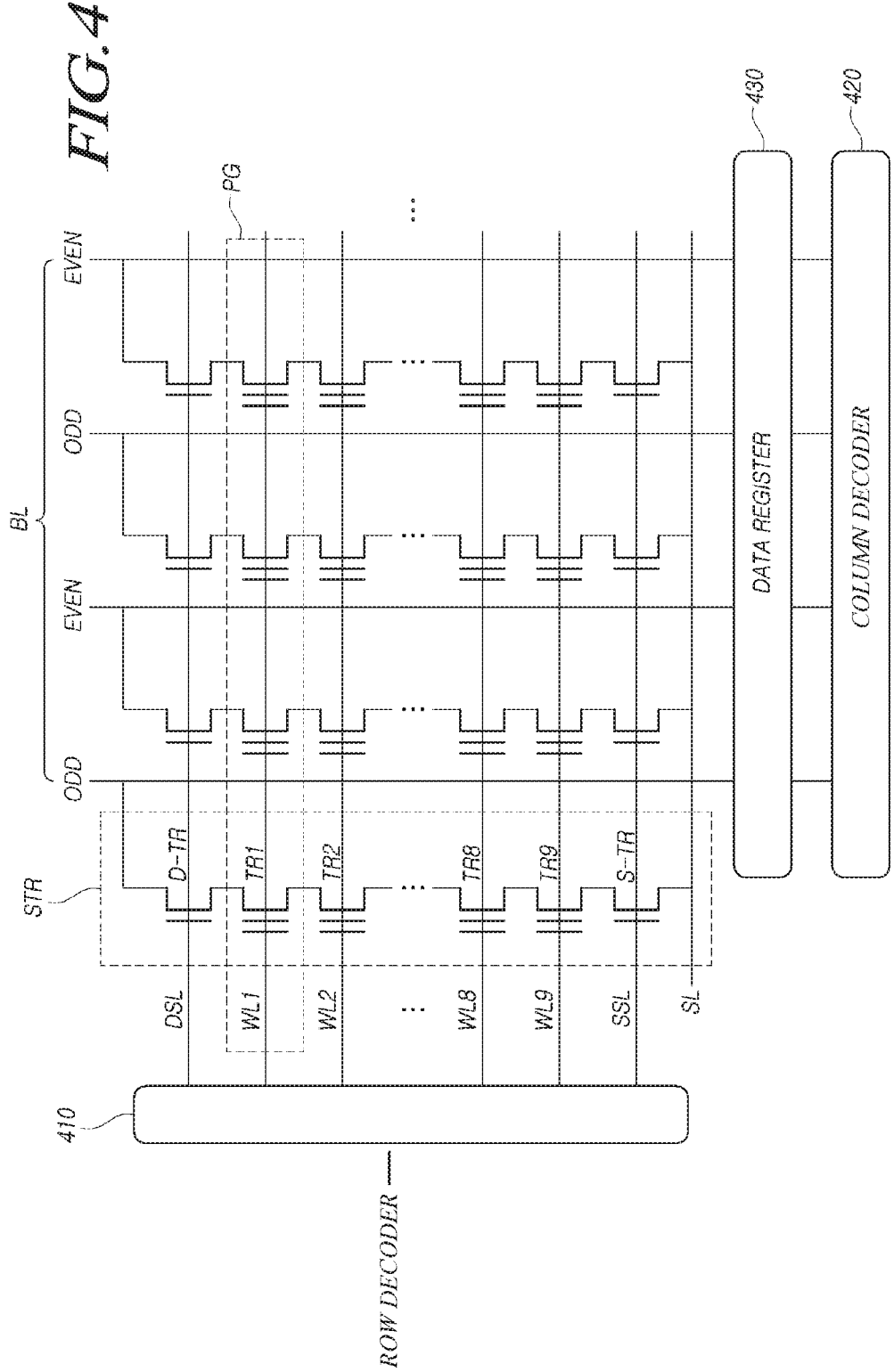
FIG. 4 is a diagram illustrating the structure of word lines and bit lines of a memory device according to embodiments of the present disclosure.

FIG. 4 is a diagram illustrating the structure of word lines WL and bit lines BL of the memory device 110 according to embodiments of the present disclosure.

Referring to FIG. 4, the memory device 110 includes a core area in which memory cells MC are concentrated and an auxiliary area which corresponds to the other area than the core area, and which supports operations of the memory cell array 210.

The core area may include pages PG and string STR. The core area has multiple word lines WL1-WL9 and multiple bit lines BL disposed to intersect with each other.

The multiple word lines WL1-WL9 may be connected to a row decoder 410, and the multiple bit lines BL may be connected to a column decoder 420. A data register 430, which corresponds to a read-and-write circuit 230, may exist between the multiple bit lines BL and the column decoder 420.

The multiple word lines WL1-WL9 correspond to multiple pages PG.

For example, as illustrated in FIG. 4, each of the multiple word lines WL1-WL9 may correspond to one page PG. Alternatively, when each of the multiple word lines WL1-WL9 has a large size, each of the multiple word lines WL1-WL9 may correspond to at least two (for example, two or four) pages PG. A page PG serves as the smallest unit in connection with conducting a program operation and a read operation, and all memory cells MC in the same page PG may perform simultaneous operations during a program operation and a read operation.

Among the multiple bit lines BL, odd-numbers bit lines BL and even-numbered bit lines BL may be distinguished and accordingly connected to the column decoder 420.

In order to access a memory cell MC, the address goes through the input/output end and then enters the core area through the row decoder 410 and the column decoder 420, and the target memory cell then can be designated. As used herein, designating a target memory cell refers to accessing one of memory cells MC at sites of intersection between word lines WL1-WL9 connected to the row decoder 410 and bit lines BL connected to the column decoder 420, in order to program data therein or to read programmed data therefrom.

Pages PG in a first direction (for example, X-axis direction) are grouped by a commonly used line referred to as a word line WL, and strings STR in a second direction (for example, Y-axis direction) are grouped (connected) by a common line referred to as a bit line BL. As used herein, being commonly grouped means that they are structurally connected by the same material, and the same voltage is simultaneously applied thereto during voltage application. The voltage applied to a memory cell MC in the intermediate or last position among memory cells MC connected in series may slightly differ from the voltage applied to the memory cell MC in the first position and the voltage applied to the memory cell MC in the last position, due to the voltage drop occurring in the memory cell MC positioned in front thereof.

All data processed by the memory device 110 is programmed and read via the data register 430, which thus plays an essential role. If data processing by the data register 430 slows down, all other areas need to wait until the data register 430 finishes the data processing. In addition, performance degradation of the data register 430 may be followed by overall performance degradation of the memory device 110.

Referring to the example in FIG. 4, multiple transistors TR1-TR9 may exist in one string STR while being connected to multiple word lines WL1-WL9. The areas in which the multiple transistors TR1-TR9 exist correspond to memory cells MC. The multiple transistors TR1-TR9 are transistors including control gates CG and floating gates FG, as described above.

The multiple word lines WL1-WL9 include two outermost word lines WL1 and WL9. A first selection line DSL may be additionally disposed outside the first outermost word line WL1, which is closer to the data register 430 in terms of the signal path among the two outermost word lines WL1 and WL9, and a second selection line SSL may be additionally disposed outside the second outermost word line WL9 which is the other thereof.

The first selection transistor D-TR, which is controlled to turn on/off by the first selection line DSL, has a gate electrode connected to the first selection line DSL but includes no floating gate FG. The second selection transistor S-TR, which is controlled to turn on/off by the second selection line SSL, has a gate electrode connected to the second selection line SSL but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR are positioned on both ends of the corresponding string STR and play the role of gatekeepers that connect and disconnect signals.

During a program operation, the memory system 100 needs to fill the target memory cell MC of the bit line BL, which is to be programmed, with electrons. Accordingly, the memory system 100 applies a predetermined turn-on voltage Vcc to the gate electrode of the first selection transistor D-TR, thereby turning on the first selection transistor D-TR, and applies a predetermined turn-off voltage (for example, 0V) to the gate electrode of the second selection transistor S-TR, thereby turning off the second selection transistor S-TR.

During a read operation or a verification operation, the memory system 100 turns on both the first selection transistor D-TR and the second selection transistor S-TR. Accordingly, a current may flow through the corresponding string STR and drain to a source line SL corresponding to the ground, thereby making it possible to measure the voltage level of the bit line BL. However, during a read operation, there may be a time difference in the on-off timing between the first selection transistor D-TR and the second selection transistor S-TR.

During an erasure operation, the memory system 100 may supply a predetermined voltage (for example, +20V) to the substrate through the source line SL. During the erasure operation, the memory system 100 floats both the first selection transistor D-TR and the second selection transistor S-TR, thereby generating an infinite resistance. The resulting structure removes the roles of the first selection transistor D-TR and the second selection transistor S-TR, and enables electrons to operate by means of the potential difference only between the floating gate FG and the substrate.

Figure 5:
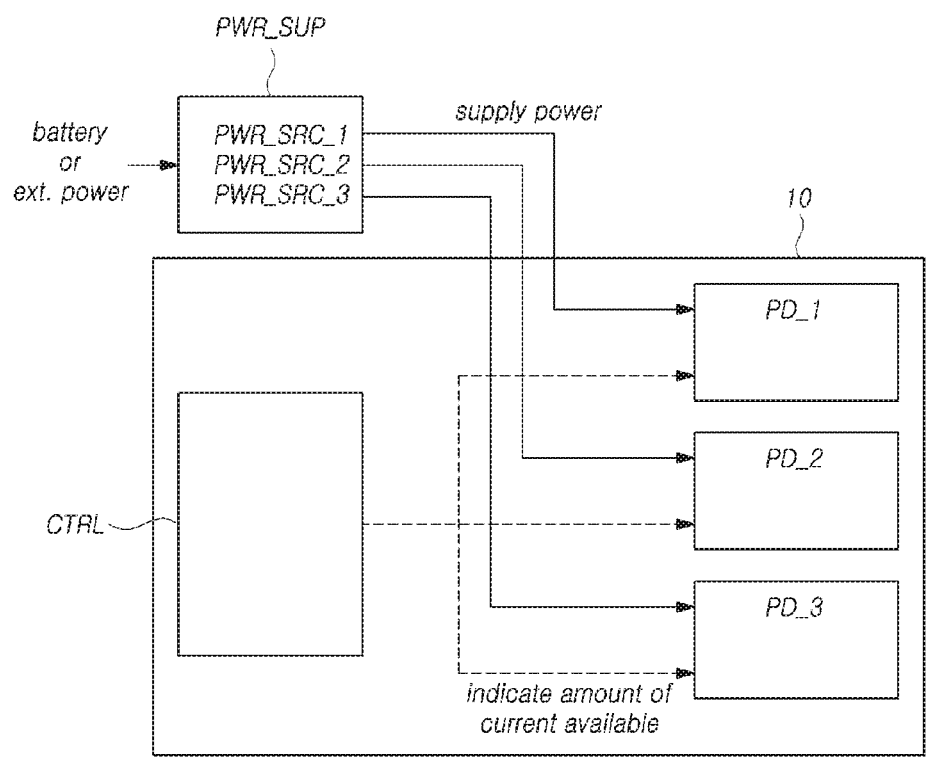
FIG. 5 is a diagram illustrating a schematic configuration of a system according to embodiments of the present disclosure.

FIG. 5 is a diagram illustrating a schematic configuration of a system 10 according to embodiments of the present disclosure.

The system 10 may include multiple power domain modules. Although it will be assumed in the description of embodiments of the present disclosure that the system 10 includes three power domain modules PD_1, PD_2, and PD_3, the number of power domain modules included in the system 10 is not limited thereto.

The power domain modules PD_1, PD_2, and PD_3 may receiver power supplied from different power sources, respectively.

For example, in FIG. 5, the power domain module PD_1 receives power supplied from the first power source PWR_SRC_1 of the power supply circuit POWER_SUP. The power domain module PD_2 receives power supplied from the second power source PWR_SRC_2 of the power supply circuit POWER_SUP. The power domain module PD_3 receives power supplied from the third power source PWR_SRC_3 of the power supply circuit POWER_SUP.

The power supply circuit PWR_SUP may be positioned inside or outside the system 10, and may distribute power supplied from a battery or an external power supply to each power domain. In this case, different power sources may supply power of different magnitudes. For example, the magnitude of power supplied through the first power source PWR_SRC_1 may be 2.5V, the magnitude of power supplied through the second power source PWR_SRC_2 may be 1.8V, and the magnitude of power supplied through the third power source PWR_SRC_3 may be 0.9V.

The controller CTRL may control the above-mentioned multiple power domain modules PD_1, PD_2, and PD_3.

Specifically, the controller CTRL may determine, with regard to the multiple power domain modules PD_1, PD_2, and PD_3, the amount of current that each power domain module can use. In addition, the controller CTRL may indicate information regarding the amount of usable current to each power domain module.

The amounts of current used by the multiple power domain modules PD_1, PD_2, and PD_3 inside the system 10 may vary depending on the operations performed by respective power domain modules. For example, the magnitude of the amount of current used by a power domain module performing an operation of reading or writing data in a memory cell may differ from that used by another power domain module performing data input/output with regard to the host.

If the magnitude of the amount of current used by each power domain module is not controlled by the controller, the timepoints at which the magnitudes of the amount of current used by respective power domain modules may overlap. This is because each power domain module is not aware of the timepoint at which another power domain module uses the maximum amount of current.

The magnitude of power used by a power domain module increases in proportion to the amount of current used thereby. Accordingly, if the timepoints at which the magnitudes of the amount of current used by respective power domain modules overlap, the total amount of power consumed by the multiple power domain modules PD_1, PD_2, and PD_3 inside the system 10 may increase abruptly. If the total sum of consumed power exceeds the maximum value allowed by the power supply circuit PWR_SUP, the power supply circuit POWER_SUP may fail to supply the power needed by the multiple power domain modules PD_1, PD_2, and PD_3. This may lead to abnormal operation of the system 10.

Accordingly, the controller CTRL may determine the amount of current that each of the multiple power domain modules PD_1, PD_2, and PD_3 can use and may indicate information regarding the amount of usable current to each power domain module such that the timepoints at which the magnitudes of the amount of current used by respective power domain modules do not overlap.

Each of the multiple power domain modules PD_1, PD_2, and PD_3 may use an amount of current within the limit of the amount of usable current indicated by the controller CTRL. By setting the limit of the amount of current that each power domain module can use, the maximum value of power consumed by the corresponding power domain module, that is, peak power, can be limited. Accordingly, the controller CTRL may control the total sum of peak power used by the multiple power domain modules PD_1, PD_2, and PD_3.

Meanwhile, the system 10 may be the memory system 100 described with reference to FIG. 1 to FIG. 4. And the controller CTRL may be the memory controller 120 described with reference to FIG. 1 to FIG. 2.

The system 10 may have a power domain module which, for example, corresponds to the control circuit 123 included in the memory controller 120 of the memory system 100. The system 10 may have a power domain module which, as another example, corresponds to the memory cell array 210 or the address decoder 220 included in the memory device 110 of the memory system 100.

Hereinafter, embodiments regarding the internal configuration and operation of the system 10 will be described.

Figure 6:
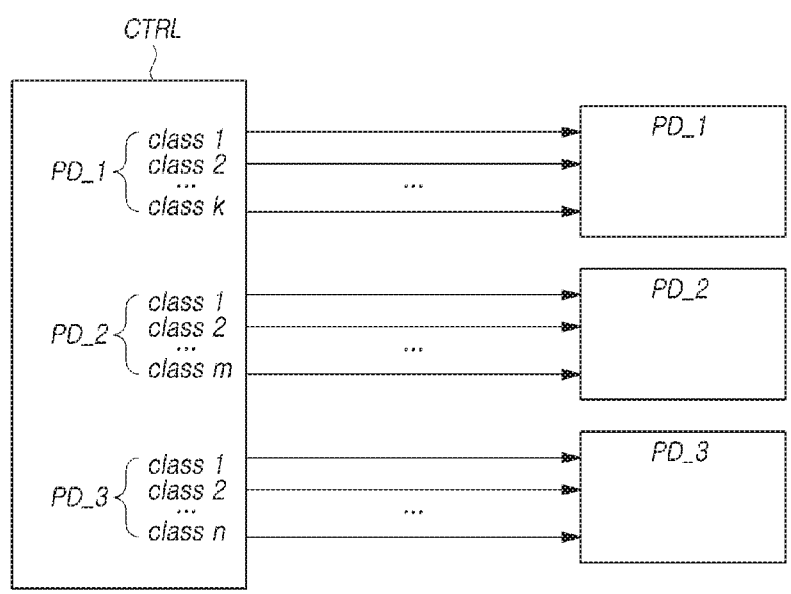
FIG. 6 is a diagram illustrating an example of the internal configuration of a system according to embodiments of the present disclosure.

FIG. 6 is a diagram illustrating an example of the internal configuration of the system 10 according to embodiments of the present disclosure.

The controller CTRL may output at least one class signal to each of power domain modules PD_1, PD_2, and PD_3 included in the system 10.

The controller CTRL may output a total of k class signals, including class 1 to class k (k is a natural number), to a power domain module PD_1. In addition, the controller CTRL may output a total of m class signals, including class 1 to class m (m is a natural number), to a power domain module PD_2. In addition, the controller CTRL may output a total of n class signals, including class 1 to class n (n is a natural number), to a power domain module PD_3. Different numbers of class signals may be output to different power domain modules, respectively.

Each class signal may indicate whether or not the power domain module to which the corresponding class signal is output can use as much current as the amount of current configured in the corresponding class signal.

For example, class signals output to the power domain module PD_1 in FIG. 6 include class 1 to class k. Assuming that the amount of current configured in class 1 is 100 milliamps (mA), class 1, among the class signals output to the power domain module PD_1, may indicate whether or not the power domain module PD_1 can use as much current as 100 mA.

The amount of current configured in each class refers to the amount of instantaneous current, which is instantly used by the corresponding power domain module. The controller CTRL may control the amount of instantaneous current used by each power domain module such that the average amount of current used by each power domain module approaches a target amount of current configured for each power domain module.

Hereinafter, specific examples of class signals that the controller CTRL outputs to the power domain modules PD_1, PD_2, and PD_3, respectively, will be described in connection with k class signals, including class 1 to class k, output to the power domain module PD_1.

Figure 7:
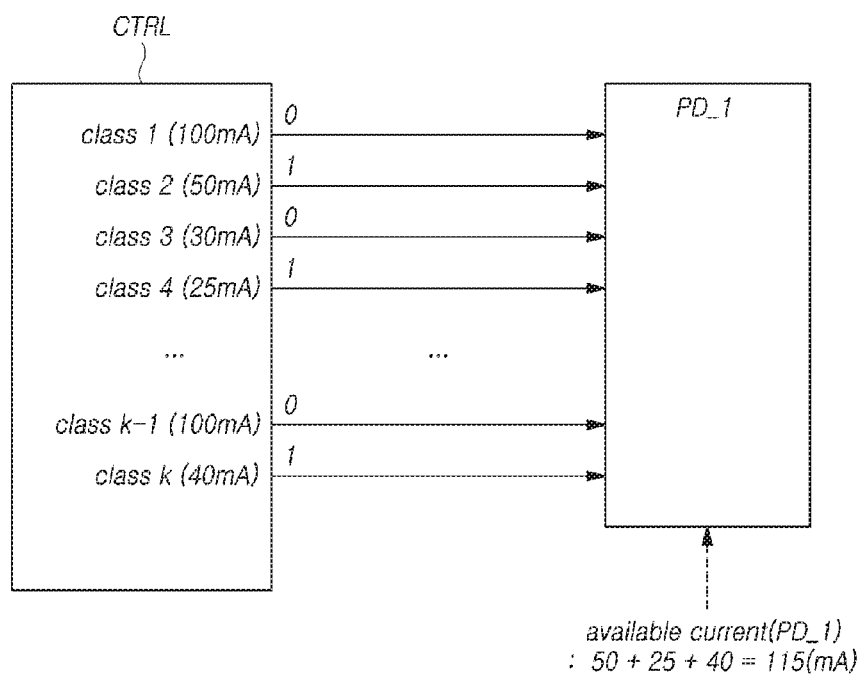
FIG. 7 is a diagram illustrating class signals output to a power domain module in FIG. 6.

FIG. 7 is a diagram illustrating class signals output to the power domain module PD_1 in FIG. 6.

The controller CTRL may output a total of k class signals, including class 1 to class k, to the power domain module PD_1.

It will be assumed in that the amount of current configured for class 1 is 100 mA, the amount of current configured for class 2 is 50 mA, the amount of current configured for class 3 is 30 mA, and the amount of current configured for class 4 is 25 mA. In addition, it will be assumed that the amount of current configured for class k−1 is 100 mA, and the amount of current configured for class k is 40 mA.

When the power domain module PD_1 can use the amount of current classified for a class signal, the controller CTRL may configure the corresponding class signal to have a first value. On the other hand, when the amount of current classified for a class signal cannot be used, the controller CTRL may configure the corresponding class signal to have a second value, which is different from the first value.

It will be assumed in FIG. 7, for example, that the first value is 1, and the second value is 0, but the first and second values may vary.

In FIG. 7, class 2, class 4, and class k have a signal value of 1, and the remaining classes have a signal value of 0. This means that the controller CTRL indicates, to the power domain module PD_1, that the amount of current that the power domain module PD_1 can use is 115 mA, which corresponds to the sum of the amount of current configured for class 2 (50 mA), the amount of current configured for class 4 (25 mA), and the amount of current configured for class k (40 mA).

If the values of k class signals change, the magnitude of the amount of current that the power domain module PD_1 can use also changes.

For example, if class 1, class 3, and class 4 have a signal value of 1, and the remaining classes have a signal value of 0, the amount of current that the power domain module PD_1 can use may be 100 mA+30 mA+25 mA=155 mA.

As another example, if class 3, class k−1, and class k have a signal value of 1, and the remaining classes have a signal value of 0, the amount of current that the power domain module PD_1 can use may be 30 mA+100 mA+40 mA=170 mA.

Hereinafter, a case in which the power domain module PD_1 includes at least one operating block OP_BLK will be described.

Figure 8:
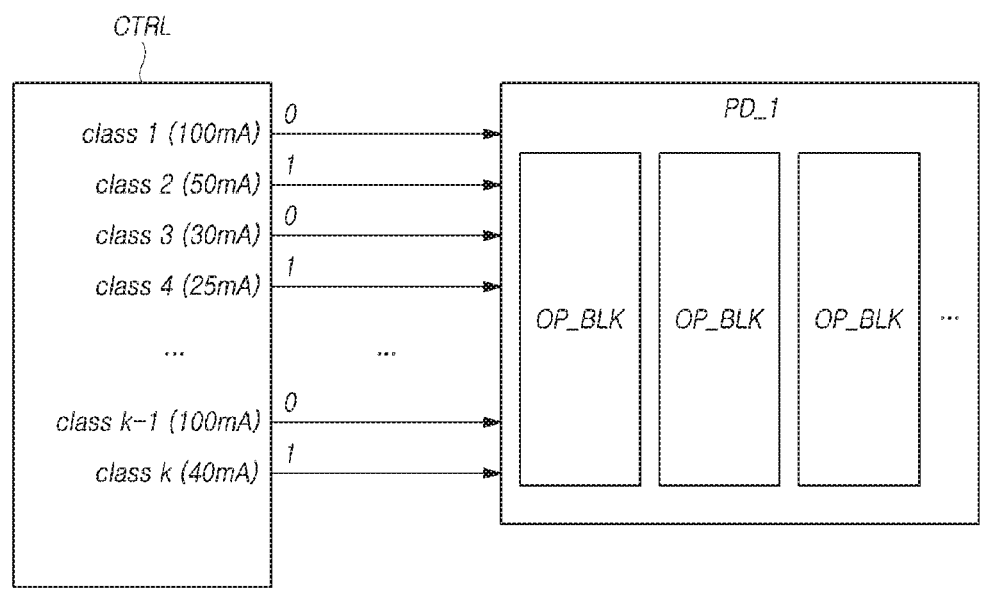
FIG. 8 is a diagram illustrating at least one operating block included in a power domain module in FIG. 7.

FIG. 8 is a diagram illustrating at least one operating block OP_BLK included in the power domain module PD_1 in FIG. 7.

The power domain module may include at least one operating block OP_BLK. The operating block OP_BLK refers to a circuit configured to perform a detailed operation of the power domain module. For example, when the power domain module is the above-mentioned control circuit 123, the processor 124 and the working memory 125 included in the control circuit 123 may correspond to operating blocks.

The power domain module PD_1 may control each operating block OP_BLK included in the power domain module PD_1 so as to use a current necessary to perform an operation within the limit of the amount of usable current indicated through class signals, including class 1 to class k, output from the controller CTRL.

In FIG. 8, among k class signals input from the controller CTRL, class 2, class 4, and class k have a signal value of 1, and the remaining classes have a signal value of 0. Accordingly, the amount of current that the power domain module PD_1 can use is 50 mA+25 mA+40 mA=115 mA. The power domain module PD_1 may control each operating block OP_BLK so as to use current within the limited amount of current of 115 mA.

The power domain module PD_1 may control each operating block OP_BLK so as to use only a part within the limit regarding the amount of current indicated through k class signals. For example, if the amount of current that the power domain module PD_1 can use is 115 mA, not all of 115 mA is to be used by at least one operating block OP_BLK included in the power domain module PD_1. The power domain module PD_1 may control at least one operating block OP_BLK included in the power domain module PD_1 so as to use only 65 mA, among the amount of usable current of 115 mA.

Hereinafter, the operation of an operating block OP_BLK will be described in connection with the first operating block OP_BLK_1, which is one of at least one operating block OP_BLK included in the power domain module PD_1.

Figure 9:
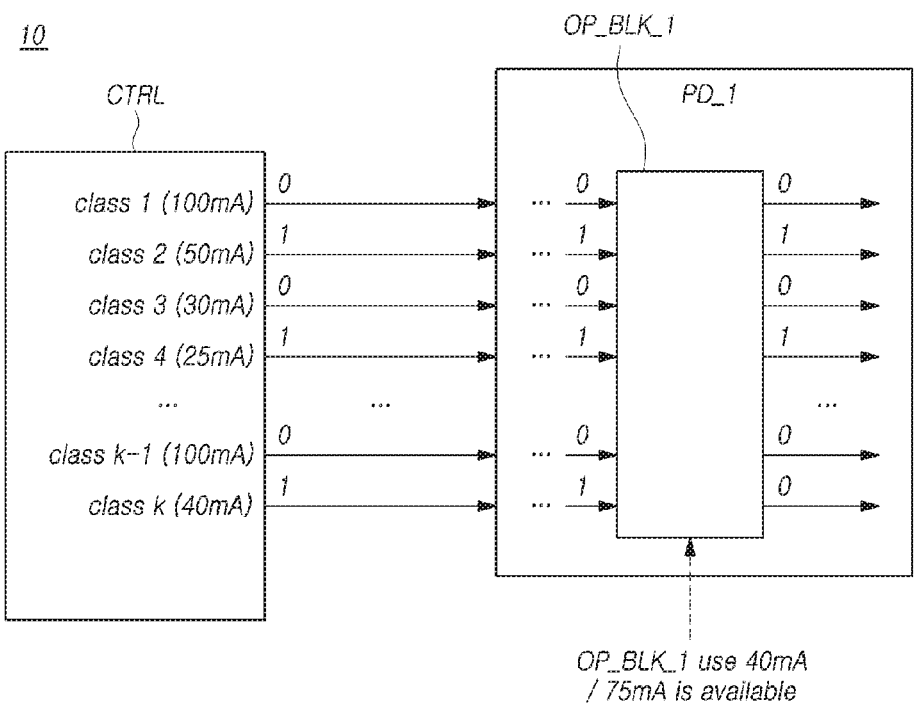
FIG. 9 is a diagram illustrating an operation of the first operating block in FIG. 8.

FIG. 9 is a diagram illustrating an operation of the first operating block OP_BLK_1 in FIG. 8.

Referring to FIG. 9, the first operating block OP_BLK_1 may receive at least one class signal indicating the amount of current that the first operating block OP_BLK_1 can use.

The first operating block OP_BLK_1 may receive k class signals, including class 1 to class k. The first operating block OP_BLK_1 may receive k class signals output by the controller CTRL directly or via another operating block.

In FIG. 9, among the k class signals output by the controller CTRL, class 2, class 4, and class k have a signal value of 1, and the remaining classes have a signal value of 0. Accordingly, the first operating block OP_BLK_1 may use a maximum current of 50 mA+25 mA+40 mA=115 mA.

In addition, the first operating block OP_BLK_1 may output at least one class signal indicating the remaining amount of current obtained by subtracting the amount of current used by the first operating block OP_BLK_1 from the amount of current that the first operating block OP_BLK_1 can use. The number of class signals output by the controller CTRL and the number of class signals output by the first operating block OP_BLK_1 are identical.

It will be assumed that, among the current that the first operating block OP_BLK_1 can use (115 mA), the amount of current indicated by class k (40 mA) has been used. In this case, the amount of remaining current, excluding the amount of current used by the first operating block OP_BLK_1, is 115 mA−40 mA=75 mA.

The first operating block OP_BLK_1 may include no circuit configured to measure the amount of used current, and thus may fail to directly measure the amount of current used by itself. In this case, the first operating block OP_BLK_1 may designate a configured prediction value as the value of the amount of current used by itself, or may check the same from a lookup table that stores values of the amount of current used by each operating block. The values of the amount of current stored in the lookup table may be values actually measured by an external device of the system 10.

For example, the first operating block OP_BLK_1 may confirm, with reference to a configured prediction value or lookup table, that a current of 40 mA will be used by a designated operation performed thereby, instead of directly measuring the amount of current used by itself (40 mA) through a current measuring circuit. In addition, the first operating block OP_BLK_1 may determine, on the basis thereof, that the amount of current used, among the amount of usable current (115 mA), is 40 mA.

The first operating block OP_BLK_1 may change the signal of class k from 1 to 0 and output the same such that the amount of current indicated by class k is not used by other operating blocks inside the power domain module PD_1 or by other power domain modules. Accordingly, among the k class signals output by the first operating block OP_BLK_1, class 2 and class 4 solely have a signal value of 1, and the remaining class signals have a signal value of 0.

The operation of one operating block included in the power domain module PD_1 has been described above.

The following description will be directed to a case in which at least two operating blocks exist in the power domain module PD_1, and the first operating block OP_BLK_1 and the second operating block OP_BLK_2, among the same, operate while interworking with each other.

Figure 10:
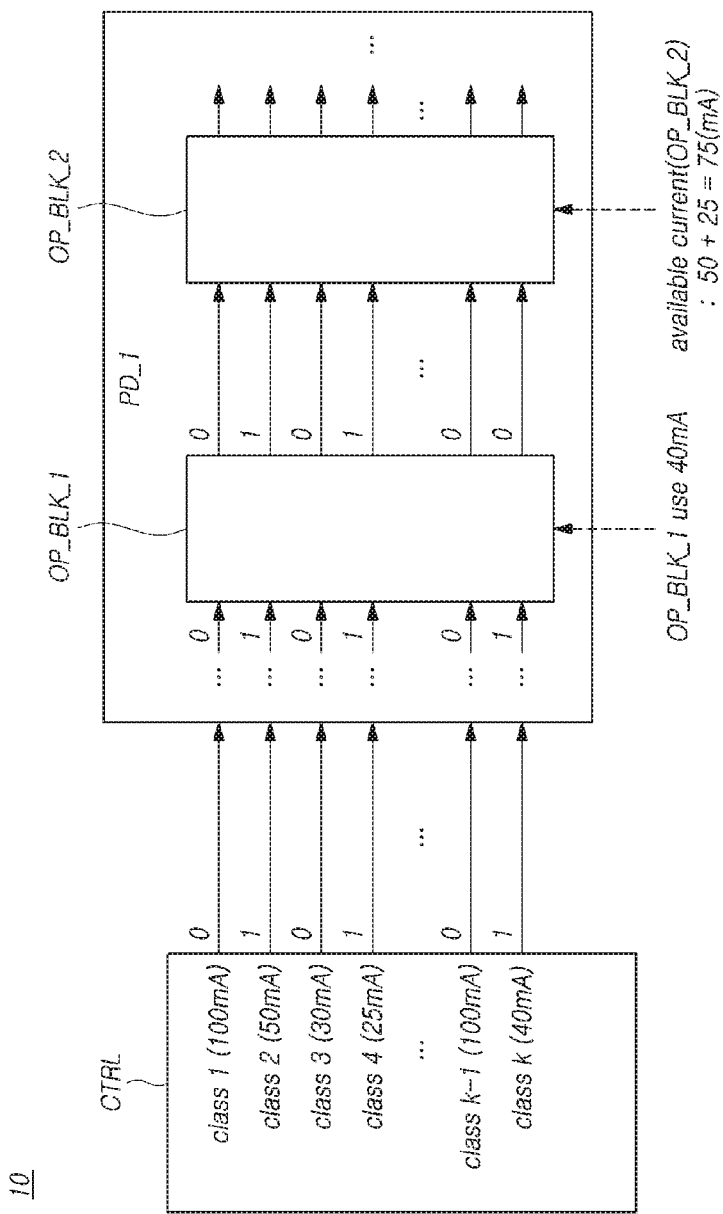
FIG. 10 is a diagram illustrating an operation of the first operating block and the second operating block in FIG. 8.

FIG. 10 is a diagram illustrating an operation of the first operating block OP_BLK_1 and the second operating block OP_BLK_2 in FIG. 8.

The first operating block OP_BLK_1 may receive k class signals, including class 1 to class k. Among the k class signals, class 2, class 4, and class k have a signal value of 1, and the first operating block OP_BLK_1 may accordingly use a maximum current of 50 mA+25 mA+40 mA=115 mA.

It will be assumed that, among the current that the first operating block OP_BLK_1 can use (115 mA), the amount of current indicated by class k (40 mA) has been used. The first operating block OP_BLK_1 may use 40 mA among the available current (115 mA), and may output k class signals, to the second operating block OP_BLK_2, indicating that the remaining current (75 mA) is available.

The second operating block OP_BLK_2 may receive at least one class signal output by the first operating block OP_BLK_1. The first operating block OP_BLK_1 may output 1 as the signal value of class 2 and class 4, among the k class signals, and may output 0 as the signal value of the remaining classes. The second operating block OP_BLK_2 may receive k class signals output by the first operating block OP_BLK_1. In addition, the second operating block OP_BLK_2 may confirm that the available current is 75 mA, which corresponds to the sum of the amount of current indicted by class 2 (50 mA) and the amount of current indicated by class 4 (25 mA).

Meanwhile, when the controller CTRL has indicated the amount of usable current through at least one class signal, the power domain module PD_1 may use only a part of the amount of usable current.

In this case, the controller CTRL may receive a feedback of information regarding the remaining amount of current, which is obtained by subtracting the amount of current used by the power domain module PD_1 from the amount of current that the power domain module PD_1 can use, from the power domain module PD_1. The controller CTRL may conduct control, on the basis of the feedback from the power domain module PD_1, such that another power domain module can use as much current as the amount of current left unused by the power domain module PD_1.

Hereinafter, an operation of the controller CTRL receiving a feedback from the power domain module PD_1 will be described.

Figure 11:
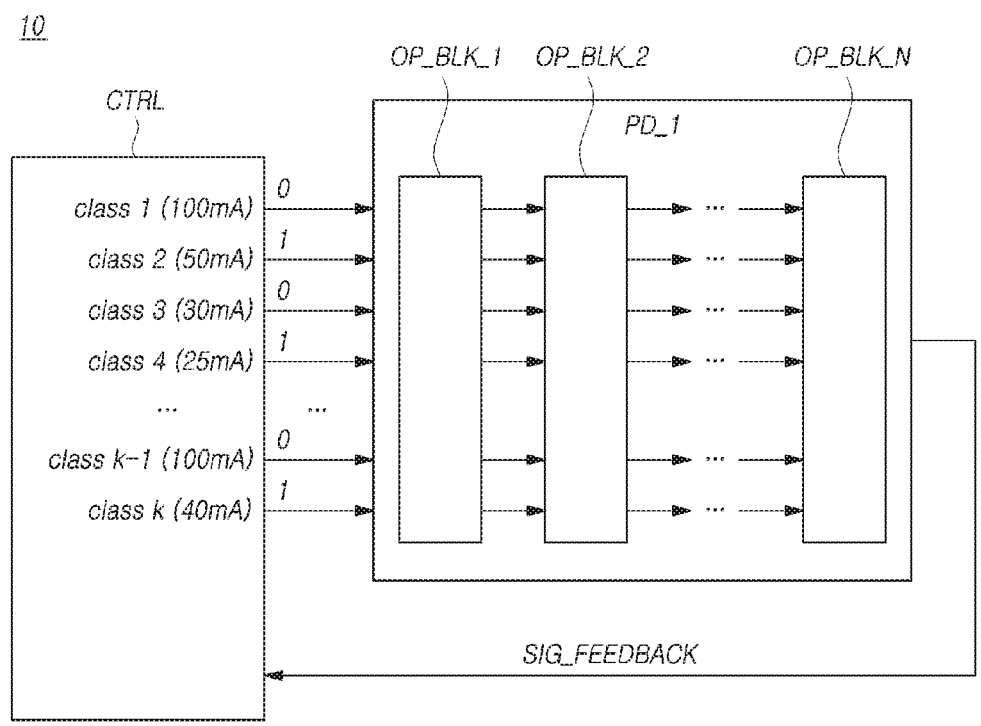
FIG. 11 is a diagram illustrating a feedback signal output from the power domain module to the controller in FIG. 8.

FIG. 11 is a diagram illustrating a feedback signal output from the power domain module PD_1 to the controller CTRL in FIG. 8.

In FIG. 11, the power domain module PD_1 includes N (N is a natural number) operating blocks OP_BLK_1, OP_BLK_2, . . . , OP_BLK_N.

The power domain module PD_1 may receive class signals, including class 1 to class k, which indicate the amount of usable current, from the controller CTRL. The power domain module PD_1 outputs a feedback signal SIG_FEEDBACK indicating information regarding the remaining amount of current, which is obtained by subtracting the amount of current used by the N operating blocks OP_BLK_1, OP_BLK_2, . . . , OP_BLK_N from the amount of usable current indicated through the k class signals.

It will be assumed for example that the controller CTRL has indicated, through k class signals, to the power domain module PD_1 that the amount of usable current is 115 mA, and that the power domain module PD_1 has used 40 mA among the same. In this case, the power domain module PD_1 may deliver information regarding the remaining amount of current (115 mA−40 mA=75 mA) to the controller CTRL through the feedback signal SIG_FEEDBACK.

Hereinafter, a specific configuration of the above-mentioned feedback signal SIG_FEEDBACK will be described with reference to FIG. 12.

Figure 12:
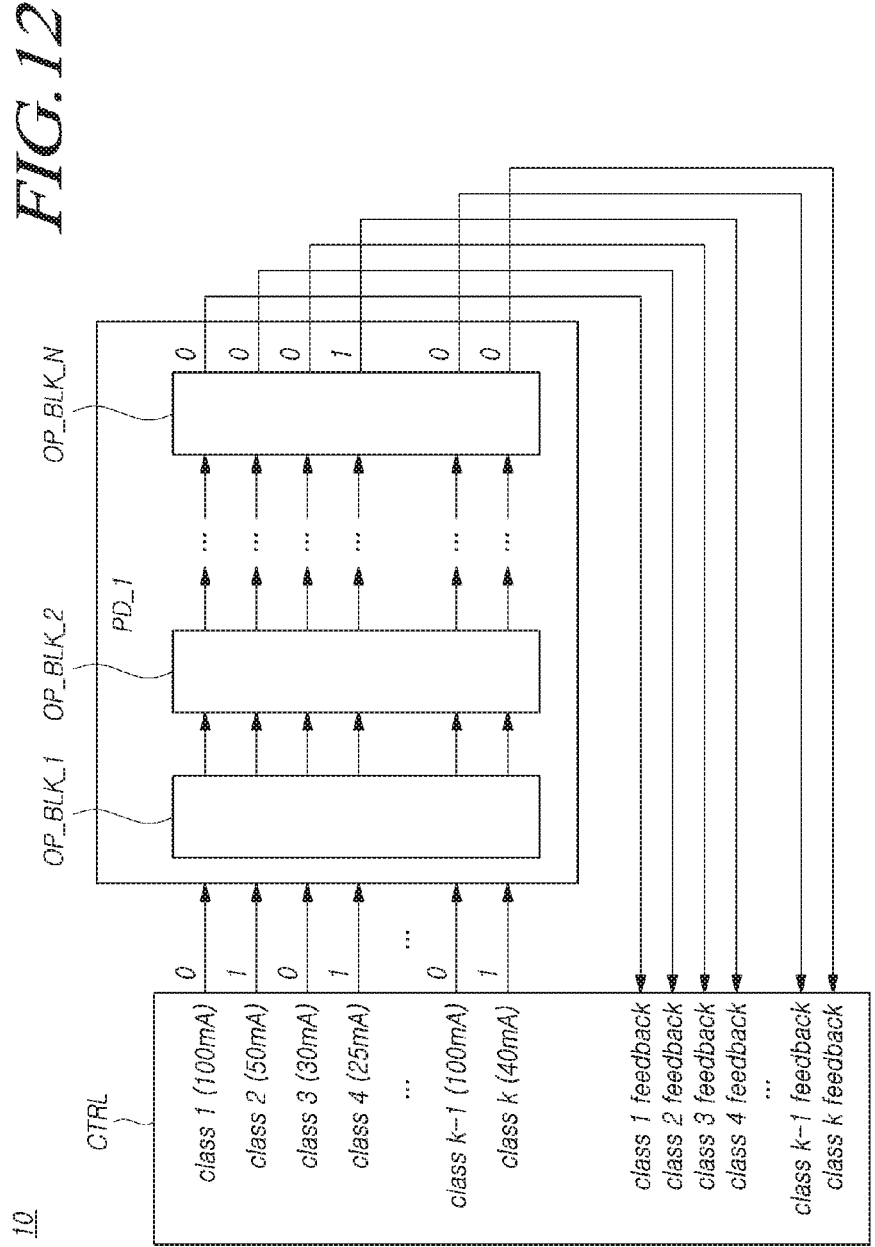
FIG. 12 is a diagram illustrating a configuration of the feedback signal in FIG. 11.

FIG. 12 is a diagram illustrating a configuration of the feedback signal SIG_FEEDBACK in FIG. 11.

The controller CTRL may output k class signals, including class 1 to class k, to the power domain module PD_1. N operating blocks OP_BLK_1, OP_BLK_2, . . . , OP_BLK_N included in the power domain module PD_1 may receive k class signals indicating the amount of usable current, respectively, and may output k class signals indicating the remaining amount of current obtained by subtracting the amount of used current from the amount of usable current.

In FIG. 12, k class signals output by the operating block OP_BLK_N included in the power domain module PD_1 correspond to feedback signals delivered to the controller CTRL.

Among the k class signals output by the operating block OP_BLK_N, class 4 solely has a signal value of 1, and the remaining class signals have a signal value of 0. This means that the power domain module PD_1 has not used the amount of current corresponding to class 4 (25 mA), among the amount of current that the power domain module PD_1 can use (115 mA). Accordingly, the controller CTRL may control another power domain module so as to use the remaining current (25 mA) not used by the power domain module PD_1.

The following description will be directed to a timing diagram illustrating class signals input to power domain modules PD_1, PD_2, and PD_3 by the controller CTRL and feedback signals output by the power domain modules PD_1, PD_2, and PD_3.

Figure 13:
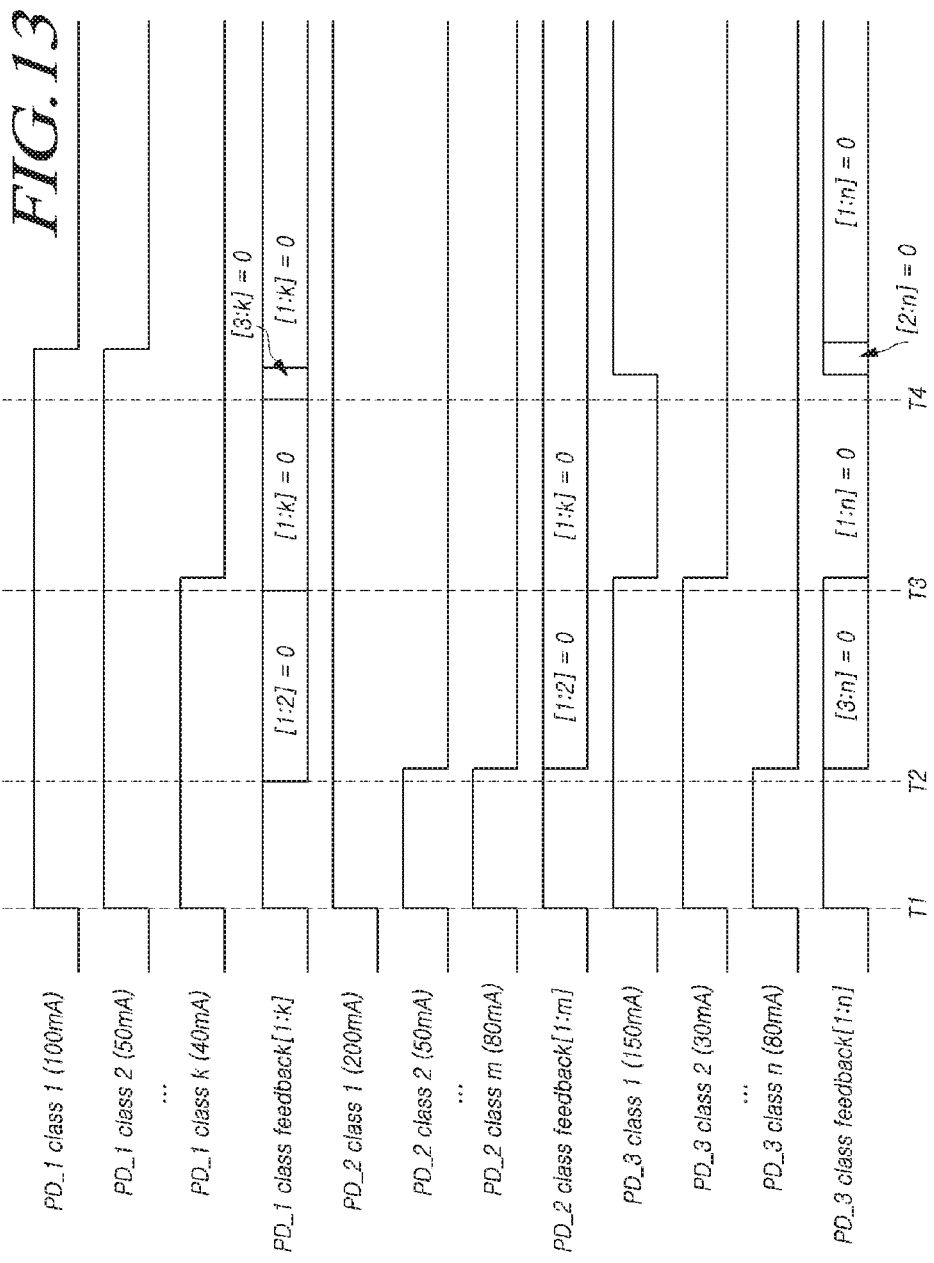
FIG. 13 is a timing diagram illustrating an example of the internal operation of the system in FIG. 6.

FIG. 13 is a timing diagram illustrating an example of the internal operation of the system 10 in FIG. 6.

It will be assumed in FIG. 13 that the controller CTRL conducts control such that the maximum value of the total sum of the amount of current used by the power domain modules PD_1, PD_2, and PD_3 is equal to or less than 350 mA.

At a timepoint T1, k class signals input to the power domain module PD_1 all have a value of 1, and k feedback signals output from the power domain module PD_1 all have a value of 1. That is, the amount of current used by the power domain module PD_1 is 0 mA.

In addition, at the timepoint T1, k class signals input to the power domain module PD_2 all have a value of 1, and k feedback signals output from the power domain module PD_2 all have a value of 1. That is, the amount of current used by the power domain module PD_2 is 0 mA.

In addition, at the timepoint T1, k class signals input to the power domain module PD_3 all have a value of 1, and k feedback signals output from the power domain module PD_3 all have a value of 1. That is, the amount of current used by the power domain module PD_3 is 0 mA.

Thereafter, at a timepoint T2, feedback signals regarding class 1 and class 2, among feedback signals output from the power domain module PD_1, change to 0. This means that the power domain module PD_1 uses as much current as 150 mA, which is the sum of the amount of current corresponding to class 1 (100 mA) and the amount of current corresponding to class 2 (50 mA).

The controller CTRL may be informed, on the basis of a feedback signal output from the power domain module PD_1, that the power domain module PD_1 uses only 150 mA, among the total sum of the amount of current that the power domain modules PD_1, PD_2, and PD_3 can use (350 mA). Accordingly, the controller CTRL may be aware that the remaining current (200 mA) is additionally usable.

In this case, all of the power domain modules PD_1, PD_2, and PD_3 may use the remaining amount of current (200 mA). Because there is a possibility that the power domain module PD_1 may use the remaining amount of current (200 mA), the controller CTRL may maintain the class signal output to the power domain module PD_1 to be 1.

Meanwhile, since the power domain module PD_2 may use only as much current as 200 mA, the controller CTRL may maintain only the signal value of class 1, which corresponds to the amount of current of 200 mA, to be 1, among the class signals output to the power domain module PD_2, and may change the signal value of class 2 to class m to 0.

Similarly, the controller CTRL may maintain only the signal value of class 1 and class 2, among the class signals output to the power domain module PD_3, to be 1, and may change the signal value of class 3 to class n to 0. This is for the purpose of guaranteeing that, under the control of the controller CTRL, the power domain module PD_3 can use the current up to the maximum of 180 mA (amount of current corresponding to class 1 (150 mA)+amount of current corresponding to class 2 (30 mA)).

At a timepoint T3, the feedback signal regarding class 1, among m feedback signals output from the power domain module PD_2, changes to 0. This means that the power domain module PD_2 uses as much current as the amount of current corresponding to class 1 (200 mA). In this case, the total sum of the amount of current used by the power domain modules PD_1, PD_2, and PD_3 becomes the maximum value allowed (350 mA).

Accordingly, the controller CTRL may change all class signals to 0, other than the signals of class 1 and class 2, among the class signals output to the power domain module PD_1, and the signal of class 1 among the class signals output to the power domain module PD_2. In this manner, the controller CTRL may control the power domain modules PD_1, PD_2, and PD_3 not to use more current than 350 mA.

At a timepoint T4, the feedback signal regarding class 1 and the feedback signal regarding class 2, among feedback signals output from the power domain module PD_1, change from 0 to 1. This means that the power domain module PD_1 no longer use the amount of current (150 mA) that has been used since the timepoint T2.

Accordingly, the controller CTRL may conduct control such that another power domain module uses the current (150 mA) not used by the power domain module PD_1. The following description will be directed to an example in which the controller CTRL controls the power domain module PD_3 to use the remaining current (150 mA).

The controller CTRL may output "1" as the signal of class 1 corresponding to the amount of current of 150 mA, among the class signals output to the power domain module PD_3, such that the power domain module PD_3 can use the remaining current of 150 mA at a timepoint T4 or later.

The power domain module PD_3 can use the remaining current of 150 mA after "1" is output as the signal of class 1 among the class signals output from the controller CTRL. If the power domain module PD_3 uses the current of 150 mA thereafter, the feedback signal regarding class 1, among the feedback signals output from the power domain module PD_3, may change from 1 to 0.

It has been assumed in the above description of an embodiment with reference to FIG. 6 to FIG. 13 that the system 10 outputs at least one class signal to at least one power domain module PD_1, PD_2, and PD_3, thereby controlling the magnitude of the amount of current that each power domain module can use.

It will be assumed in the following description of an embodiment that, instead of outputting a class signal, the system 10 outputs a grant signal on the basis of a request signal received from each of at least one power domain modules PD_1, PD_2, and PD_3, thereby controlling the magnitude of the amount of current that each power domain module can use.

Figure 14:
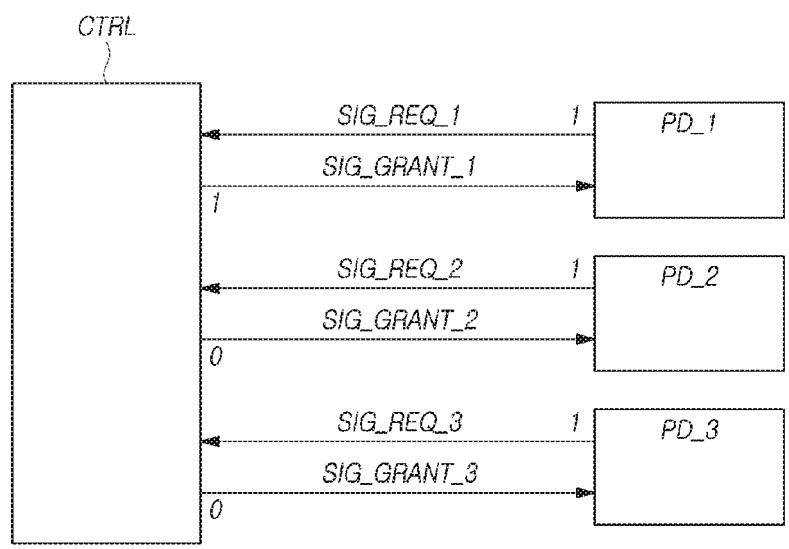
FIG. 14 is a diagram illustrating another example of the internal configuration of the system according to embodiments of the present disclosure.

FIG. 14 is a diagram illustrating another example of the internal configuration of the system 10 according to embodiments of the present disclosure.

The controller CTRL may receive a request signal from each of power domain modules PD_1, PD_2, and PD_3. In FIG. 14, the controller CTRL may receive a request signal SIG_REQ_1 from the power domain module PD_1. In addition, the controller CTRL may receive a request signal SIG_REQ_2 from the power domain module PD_2. In addition, the controller CTRL may receive a request signal SIG_REQ_3 from the power domain module PD_3.

A request signal refers to a signal indicating information regarding the amount of current requested by a power domain module. That is, the request signal is used to request the controller CTRL to allow the power domain module to use as much current as necessary.

The value of the request signal may be configured variously.

For example, a power domain module may output a signal indicating a value corresponding to the amount of current needed by the corresponding power domain module as a request signal. If a power domain module wants to request the controller CTRL to allow use of as much current as 1000 mA, the power domain module may output a request signal indicating a value of 1000. On the other hand, if the power domain module wants to request the controller CTRL to allow use of as much current as 500 mA, the power domain module may output a request signal indicating a value of 500.

As another example, when a power domain module wants to request the controller CTRL to allow the corresponding power domain module to use as much current as a configured amount of current, the same may output a request signal of 1. On the other hand, a power domain module may output a request signal of 0 to indicate to the controller CTRL that the corresponding power domain module does not want to use the configured amount of current.

The following description will be directed to a case in which a power domain module outputs "0" or "1" as a request signal.

In response to a request signal SIG_REQ_1 received from the power domain module PD_1, the controller CTRL may output a grant signal SIG_GRANT_1 to the power domain module PD_1. In addition, in response to a request signal SIG_REQ_2 received from the power domain module PD_2, the controller CTRL may output a grant signal SIG_GRANT_2 to the power domain module PD_2. In addition, in response to a request signal SIG_REQ_3 received from the power domain module PD_3, the controller CTRL may output a grant signal SIG_GRANT_3 to the power domain module PD_3.

The grant signal is used by the controller CTRL to indicate, to a power domain module, information regrading the amount of current that the corresponding power domain module can use.

For example, the controller CTRL may output a signal indicating a value corresponding to the amount of current that a power domain module can use, to the corresponding power domain module. It will be assumed that a power domain module outputs "1000" as the value of a request signal in order to request the controller CTRL to allow the corresponding power domain module to use as much current as 1000 mA.

The controller CTRL may output "1000" as a grant signal to allow the corresponding power domain module to use as much current as 1000 mA. On the other hand, controller CTRL may output "500" as a grant signal to allow the corresponding power domain module to use as much current as 500 mA.

As another example, the controller CTRL may output "1," as a grant signal, to a power domain module to allow the corresponding power domain module to use as much current as a configured amount of current. On the other hand, the controller CTRL may output "0," as a grant signal, to a power domain module to indicate that the corresponding power domain module cannot use as much current as the configured amount of current. In this case, the corresponding power domain module needs to wait, in order to use the necessary current, until the grant signal output to the corresponding power domain module by the controller CTRL becomes "1."

The following description will be directed to a case in which a power domain module outputs "0" or "1" as a grant signal.

In FIG. 14, the power domain modules PD_1, PD_2, and PD_3 may all output "1" as a request signal. That is, each of the power domain modules PD_1, PD_2, and PD_3 may request the controller CTRL to allow the same to use as much current as a configured amount.

In this case, the controller CTRL may configure the value of the grant signal SIG_GRANT_1 output to the power domain module PD_1 to be 1. On the other hand, the controller CTRL may configure the value of the grant signal SIG_GRANT_2 output to the power domain module PD_2 and the value of the grant signal SIG_GRANT_3 output to the power domain module PD_3 to be 0. This means that the controller CTRL allows the power domain module PD_1 to use as much current as the configured amount and does not allow the power domain module PD_2 and the power domain module PD_3 to use as much current as the configured amount.

It has been assumed in the description with reference to FIG. 14 that the controller CTRL configures the value of one grant signal to be 1 and configures the value of the remaining grant signals to be 0. However, the controller CTRL may configure the value of multiple grant signals to be 1 as long as the total sum of the amount of current used by all power domain modules does not exceed the maximum value allowed.

The above-mentioned request signals and grant signals may have values changing over time.

Figure 15:
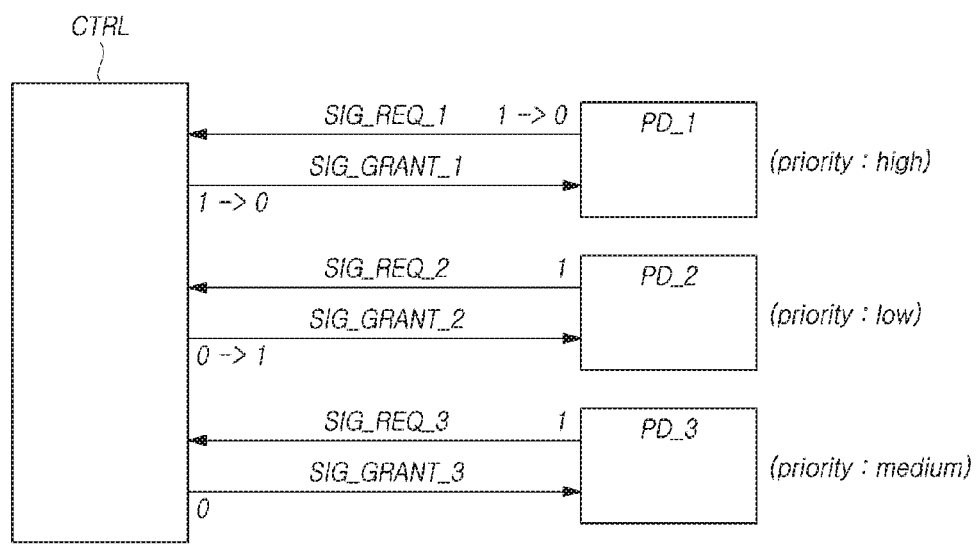
FIG. 15 is a diagram illustrating changes in request signals and grant signals in FIG. 14.

FIG. 15 is a diagram illustrating changes of request signals and grant signals in FIG. 14.

In FIG. 15, the request signal output by the power domain module PD_1 is changed from 1 to 0. That is, the controller CTRL is informed that the power domain module PD_1 uses no current.

If the request signal SIG_REQ_1 output by the power domain module PD_1 is changed to 0, the controller CTRL may change the grant signal SIG_GRANT_1 output to the power domain module PD_1 from 1 to 0. This is because the power domain module PD_1 no longer uses current, and the controller CTRL thus does not have to allow the power domain module PD_1 to use as much current as the configured amount.

The controller CTRL may control the power domain module PD_2 or the power domain module PD_3 to use as much current as the amount of current that has been used by the power domain module PD_1. For example, the controller CTRL may change the grant signal SIG_GRANT_2 output to the power domain module PD_2 from 0 to 1 such that the power domain module PD_2 can use current.

When the controller CTRL determines the value of a grant signal to be output to a specific power domain module in this manner, the same may refer to priority configured for each power domain module. For example, the controller CTRL may adjust grant signals output to respective power domain modules such that a power domain module having high priority can use the necessary current with a high frequency.

Figure 16:
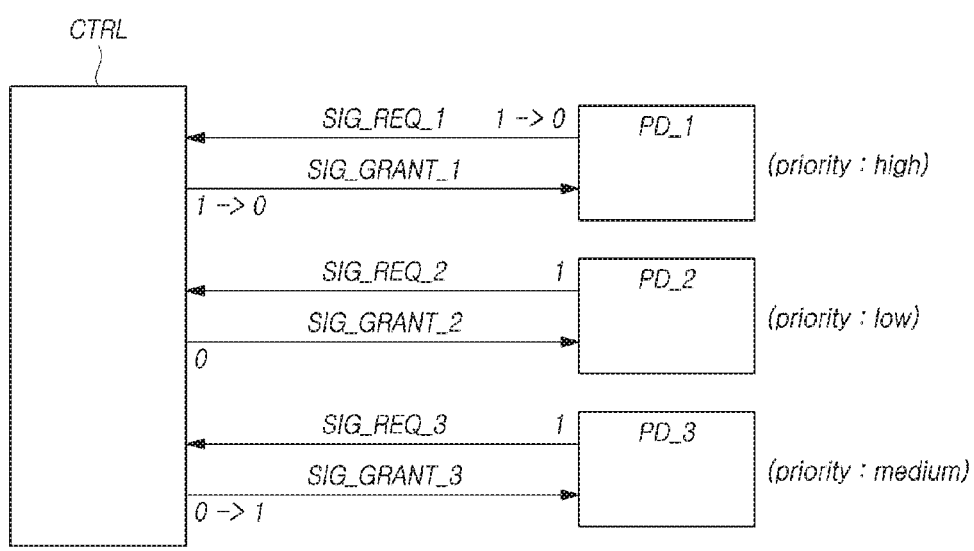
FIG. 16 is a diagram illustrating changes in request signals and grant signals according to the priority configured for power domain modules in FIG. 14.

FIG. 16 is a diagram illustrating changes of request signals and grant signals according to the priority configured for power domain modules in FIG. 14.

Referring to FIG. 16, the controller CTRL may configure the value of the grant signal SIG_GRANT_1 output to the power domain module PD_1 to be 1 such that the power domain module PD_1, which has the highest priority, can use current.

Thereafter, if the request signal SIG_REQ_1 output by the power domain module PD_1 is changed to 0, the controller CTRL may change the value of the grant signal SIG_GRANT_1 output to the power domain module PD_1 from 1 to 0.

Thereafter, the controller CTRL may change the value of the grant signal SIG_GRANT_3 output to the power domain module PD_3 from 0 to 1 such that the power domain module PD_3, which has the higher priority among the power domain module PD_2 and the power domain module PD_3, can first use as much current as the configured amount of current.

On the other hand, if the value of the request signal SIG_REQ_1 output by the power domain module PD_1 and the value of the request signal SIG_REQ_3 output by the power domain module PD_3 are both 0, the controller CTRL may change the value of the grant signal SIG_GRANT_2 output to the power domain module PD_2, which has the lowest priority among the power domain modules PD_1, PD_2, and PD_3, from 0 to 1.

The following description will be made with reference to a timing diagram illustrating request signals SIG_REQ_1, SIG_REQ_2, and SIG_REQ_3 output by power domain modules PD_1, PD_2, and PD_3, respectively, and grant signals SIG_GRANT_1, SIG_GRANT_2, and SIG_GRANT_3 output to the power domain modules PD_1, PD_2, and PD_3 by the controller CTRL, respectively.

Figure 17:
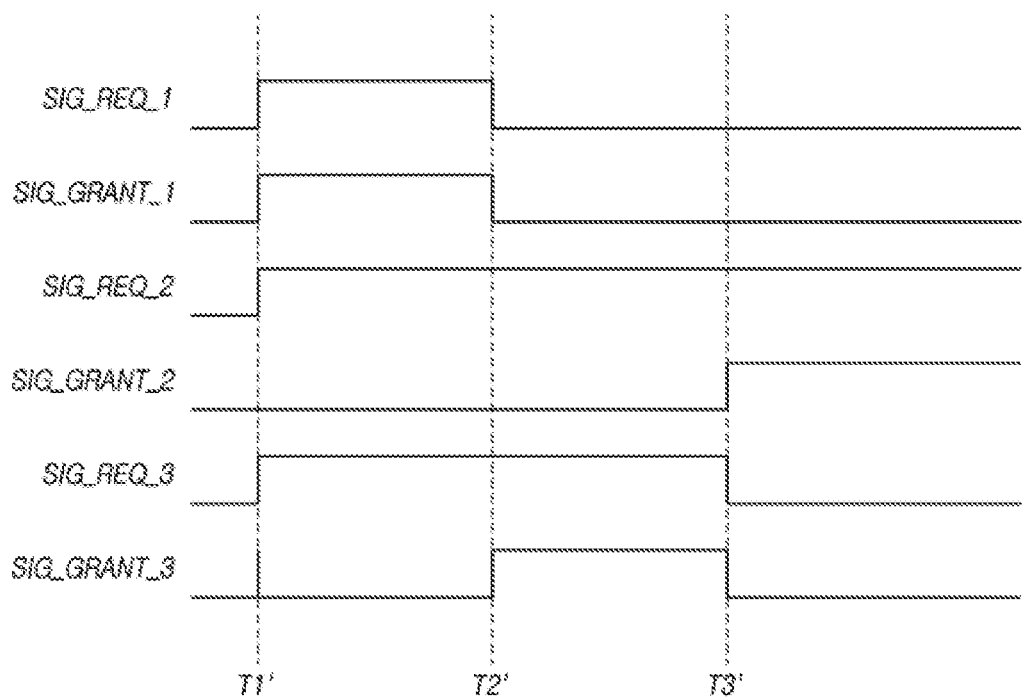
FIG. 17 is a diagram illustrating an example of the internal operation of the system in FIG. 14.

FIG. 17 is a diagram illustrating an example of the internal operation of the system 10 in FIG. 14.

Referring to FIG. 17, at a timepoint T1', the request signal SIG_REQ_1 output by the power domain module PD_1, the request signal SIG_REQ_2 output by the power domain module PD_2, and the request signal SIG_REQ_3 output by the power domain module PD_3 all have a value of 1. In addition, the grant signal SIG_GRANT_1 output to the power domain module PD_1 by the controller CTRL is 1, the grant signal SIG_GRANT_2 output to the power domain module PD_2 by the controller CTRL is 0, and the grant signal SIG_GRANT_3 output to the power domain module PD_3 by the controller CTRL is 0.

Thereafter, if the request signal SIG_REQ_1 output by the power domain module PD_1 changes its value from 1 to 0 at a timepoint T2', the grant signal SIG_GRANT_1 output to the power domain module PD_1 by the controller CTRL changes its value from 1 too.

In addition, the controller CTRL may change the grant signal SIG_GRANT_3 output to the power domain module PD_3 from 0 to 1 such that the power domain module PD_3 can use as much current as the configured amount of current.

Thereafter, if the request signal SIG_REQ_3 output by the power domain module PD_3 changes its value from 1 to 0 at a timepoint T3', the grant signal SIG_GRANT_3 output to the power domain module PD_3 by the controller CTRL changes its value from 1 to 0.

In addition, the controller CTRL may change the grant signal SIG_GRANT_2 output to the power domain module PD_2 from 0 to 1 such that the power domain module PD_2 can use as much current as the configured amount of current.

Figure 18:
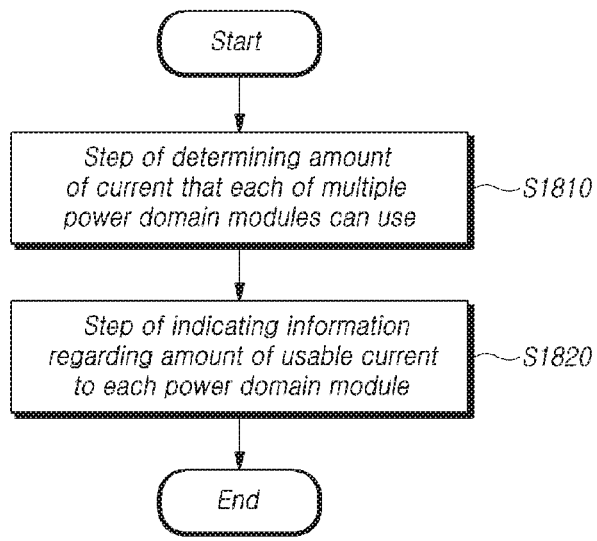
FIG. 18 is a diagram illustrating a method for operating a system according to embodiments of the present disclosure.

FIG. 18 is a diagram illustrating a method for operating a system 10 according to embodiments of the present disclosure.

The method for operating a system 10 may include a step of determining the amount of current that each of multiple power domain modules can use (S1810). The multiple power domain modules may receive power supplied from different power sources, respectively.

In addition, the method for operating a system 10 may include a step of indicating information regarding the amount of usable current to each of the power domain modules described above (S1820).

For example, in step S1820, the controller CTRL of the system 10 may output at least one class signal to each power domain module. Each class signal may indicate whether or not the power domain module to which the corresponding class signal is output can use as much current as the amount of current configured in the corresponding class signal.

Each of the power domain modules described above may include at least one operating block. The first operating block, among the same, may receive at least one class signal indicating the amount of current that the first operating block can use, and may output at least one class signal indicating the remaining amount of current obtained by subtracting the amount of current used by the first operating block from the amount of current that the first operating block can use.

As another example, in step S1820, the controller CTRL of the system 10 may receive a request signal input from each power domain module. The request signal is used to indicate information regarding the amount of current requested by the corresponding power domain module.

In addition, the controller CTRL of the system 10 may output a grant signal to each power domain module. The grant signal is used to indicate information regarding the amount of current that the corresponding power domain module can use.

Figure 19:
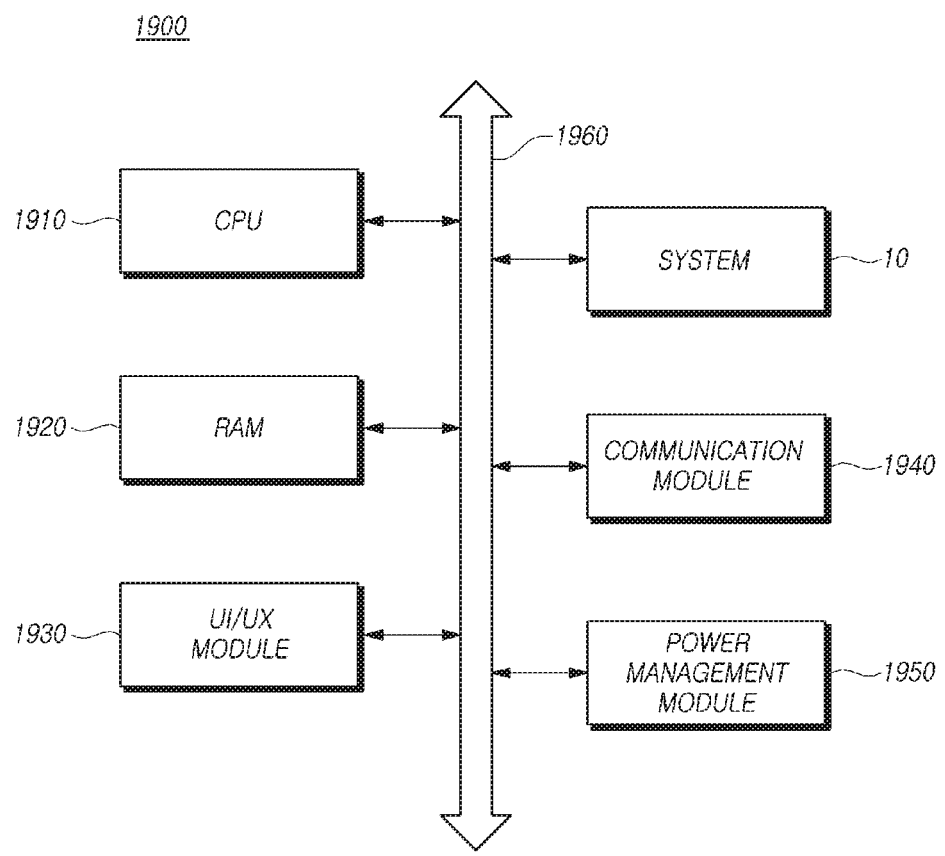
FIG. 19 is a diagram illustrating the configuration of a computing system according to embodiments of the present disclosure.

FIG. 19 is a diagram illustrating the configuration of a computing system 1900 according to embodiments of the present disclosure.

Referring to FIG. 19, the computing system 1900 may include: a system 10 electrically connected to a system bus 1960; a CPU 1910 configured to control overall operations of the computing system 1900; a RAM 1920 configured to store data and information related to operations of the computing system 1900; a user interface/user experience (UI/UX) module 1930 configured to provide the user with a user environment; a communication module 1940 configured to communicate with an external device in a wired and/or wireless manner; a power management module 1950 configured to manage power used by the computing system 1900; and the like.

The computing system 1900 may be a personal computer (PC) or may include a mobile terminal (for example, a smartphone or a tablet) or various kinds of other electronic devices.

The computing system 1900 may further include a battery for supplying a dynamic voltage, an application chipset, a graphic-related module, a camera image processor (CIS), and a DRAM. The computing system 1300 may also include other components, as would be understood by a person of ordinary skill in the art.

Meanwhile, the system 10 may be, for example, the memory system 100 described with reference to FIG. 1 to FIG. 4.

The memory system 100 may include not only a device configured to store data in a magnetic disk, such as a hard disk drive (HDD), but also a device configured to store data in a nonvolatile memory, such as a solid state drive (SSD), a universal flash storage (UFS) device, and an embedded MMC (eMMC) device. The nonvolatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), and a ferroelectric RAM (FRAM). Furthermore, the memory system 100 may be implemented as storage devices in various types and mounted inside various electronic devices.

Although the above description of the technical idea of the present disclosure has been given merely for illustrative purposes, those skilled in the art will appreciate that various modifications and changes may be made without departing from the essential scope and spirit of the present disclosure. Further, the embodiments disclosed herein are not intended to limit the technical idea of the present disclosure but intended to explain the technical idea of the present disclosure, and thus the scope of the technical idea of the present disclosure is not limited by these embodiments. The protection scope of the present disclosure shall be construed on the basis of the appended claims in such a manner that all the technical ideas equivalent to the claims fall within the scope of the present disclosure.

What is claimed is:

1. A system comprising:
    multiple power domain modules configured to respectively receive power supplied from different power sources; and
    a controller configured to control the multiple power domain modules, wherein
    the controller is configured to determine the amount of current that each power domain module can use and to indicate information regarding the amount of usable current to each power domain module, thereby controlling the total sum of peak power used by the multiple power domain modules,
    wherein the controller is configured to output at least one class signal to each power domain module, and each of the at least one class signal indicates whether or not each power domain module can use as much current as the amount of current configured in each class signal.

2. The system of claim 1, wherein each power domain module comprises at least one operating block, and
    a first operating block among the at least one operating block receives at least one class signal indicating the amount of current that the first operating block can use and to output at least one class signal indicating the remaining amount of current obtained by subtracting the amount of current used by the first operating block from the amount of current that the first operating block can use.

3. The system of claim 2, wherein the value of the amount of current used by the first operating block is a configured prediction value or a value stored in a configured lookup table.

4. The system of claim 3, wherein, when each power domain module comprises at least two operating blocks, and when there exists a second operating block configured to receive at least one class signal output by the first operating block, then the first operating block outputs at least one class signal indicating the remaining amount of current to the second operating block.

5. The system of claim 1, wherein each power domain module is configured to output a feedback signal indicating the remaining amount of current, excluding the amount of current used by each power domain module, to the controller.

6. The system of claim 5, wherein the controller is configured to update the amount of current that each power domain module can use, on the basis of a feedback signal from each power domain module.

7. The system of claim 1, wherein the controller is configured to receive a request signal from each power domain module, the request signal being a signal indicating information regarding the amount of current requested by each power domain module, and to output a grant signal to each power domain module, the grant signal being a signal indicating information regarding the amount of current that each power domain module can use.

8. The system of claim 7, wherein the controller is configured such that, if a request signal received from one of the multiple power domain modules is changed, the grant signal output to each power domain module is updated.

9. The system of claim 8, wherein the controller is configured to update the grant signal output to each power domain module on the basis of priority configured for each power domain module.

10. A controller configured to determine the amount of current that each of multiple power domain modules receiving power from different power sources, respectively, can use and to indicate information regarding the amount of usable current to each power domain module, thereby controlling the total sum of peak power used by the multiple power domain modules,
    wherein the controller is configured to output at least one class signal to each power domain module, and each of the at least one class signal indicates whether or not each power domain module can use as much current as the amount of current configured in each class signal.

11. The controller of claim 10, wherein the controller is configured to receive a request signal from each power domain module, the request signal being a signal indicating information regarding the amount of current requested by each power domain module, and to output a grant signal to each power domain module, the grant signal being a signal indicating information regarding the amount of current that each power domain module can use.

12. A method for operating a system, the method comprising:
    determining the amount of current that each of multiple power domains modules receiving power from different power sources, respectively, can use; and
    indicating information regarding the amount of usable current to each power domain module,
    wherein, indicating information regarding the amount of usable current to each power domain module comprises:
    outputting at least one class signal to each power domain module, wherein each of the at least one class signal indicates whether or not each power domain module can use as much current as the amount of current configured in each class signal.

13. The method of claim 12, wherein each power domain module comprises at least one operating block, and wherein the method further comprises a first operating block among the at least one operating block:

receiving at least one class signal indicating the amount of current that the first operating block can use; and outputting at least one class signal indicating the remaining amount of current obtained by subtracting the amount of current used by the first operating block from the amount of current that the first operating block can use.

14. The method of claim 12, wherein indicating information regarding the amount of usable current to each power domain module comprises:

receiving a request signal from each power domain module, wherein the request signal is a signal indicating information regarding the amount of current requested by each power domain module, and outputting a grant signal to each power domain module, wherein the grant signal is a signal indicating information regarding the amount of current that each power domain module can use.

* * * * *